US011184877B2

(12) United States Patent
Deng et al.

(10) Patent No.: US 11,184,877 B2
(45) Date of Patent: Nov. 23, 2021

(54) BEAMFORMED PAGING TRANSMISSION

(71) Applicant: IDAC Holdings, Inc., Wilmington, DE (US)

(72) Inventors: Tao Deng, Roslyn, NY (US); Benoit Pelletier, Roxboro (CA); Paul Marinier, Brossard (CA); J. Patrick Tooher, Montreal (CA); Ghyslain Pelletier, Montreal (CA); Yugeswar Deenoo, Chalfont, PA (US); Martino M. Freda, Laval (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/494,468

(22) PCT Filed: Mar. 20, 2018

(86) PCT No.: PCT/US2018/023363
§ 371 (c)(1),
(2) Date: Sep. 16, 2019

(87) PCT Pub. No.: WO2018/175442
PCT Pub. Date: Sep. 27, 2018

(65) Prior Publication Data
US 2020/0092846 A1 Mar. 19, 2020

Related U.S. Application Data

(60) Provisional application No. 62/543,126, filed on Aug. 9, 2017, provisional application No. 62/474,867, filed on Mar. 22, 2017.

(51) Int. Cl.
*H04W 68/00* (2009.01)
*H04W 68/02* (2009.01)
*H04B 7/06* (2006.01)

(52) U.S. Cl.
CPC ........ *H04W 68/025* (2013.01); *H04B 7/0695* (2013.01)

(58) Field of Classification Search
CPC ............. H04W 72/042; H04W 56/001; H04W 74/0833; H04W 72/0446; H04W 72/046; H04W 72/0453; H04W 24/08
See application file for complete search history.

(56) References Cited

U.S. PATENT DOCUMENTS

| | | | |
|---|---|---|---|
| 2014/0128109 A1* | 5/2014 | Li | H04W 68/02 455/458 |
| 2018/0026698 A1* | 1/2018 | Lee | H04B 7/0639 370/335 |

(Continued)

OTHER PUBLICATIONS

3rd Generation Partnership Project (3GPP), R1-1700461,"Discussion on Paging Design in NR", 3GPP TSG RAN WG1 NR Ad-Hoc Meeting, LG Electronics, Spokane, USA, Jan. 16-20, 2017, 4 pages.

(Continued)

*Primary Examiner* — Khalid W Shaheed
(74) *Attorney, Agent, or Firm* — Condo Roccia Koptiw LLP

(57) ABSTRACT

One or more techniques for beamformed paging are disclosed. A transmission/reception point (TRP) may transmit a paging inquiry signal using beam sweeping in a paging inquiry (PI) block with a different time, frequency resource set and/or sequence configuration associated with the same paging occasion (PO), for example, to randomize and/or distribute WTRUs into different monitoring groups. A WTRU may transmit an uplink paging inquiry response indicating a downlink beam for a paging data transmission and/or a WTRU ID. A downlink control and/or a data channel transmission may be triggered by a paging inquiry response transmission. Paging downlink control information may be transmitted in a WTRU-specific control channel, (Continued)

which may contain CRC bits masked by a temporary paging identity, e.g., based on a WTRU ID that may be reported in a paging inquiry response transmission. A WTRU paging procedure may be based on a paging inquiry signal and/or response transmission.

17 Claims, 13 Drawing Sheets

(56) References Cited

U.S. PATENT DOCUMENTS

| | | | |
|---|---|---|---|
| 2018/0205585 A1* | 7/2018 | Sadiq | H04B 7/088 |
| 2018/0234931 A1* | 8/2018 | Ly | H04L 5/005 |
| 2019/0182817 A1* | 6/2019 | Agiwal | H04W 72/0406 |

OTHER PUBLICATIONS

3rd Generation Partnership Project (3GPP), R1-1702591,"Paging Design Consideration", 3GPP TSG-RAN WG1 #88, Qualcomm Incorporated, Athens, Greece, Feb. 13-17, 2017, pp. 1-3.

3rd Generation Partnership Project (3GPP), R1-1703230, "Considerations on Paging Design", 3GPP TSG RAN WG1 Meeting #88, XiaoMi Communications, Athens, Greece, Feb. 13-17, 2017, 2 pages.

3rd Generation Partnership Project (3GPP), R2-1700443, "On-Demand Paging in RRC_IDLE", 3GPP TSG-RAN WG2 NR Ad Hoc, LG Electronics Inc., Spokane, USA, Jan. 17-19, 2017, pp. 1-2.

3rd Generation Partnership Project (3GPP), R2-1700980, "Paging Mechanism in NR", 3GPP TSG-RAN WG2 Meeting #97, CATT, Athens, Greece, Feb. 13-17, 2017, pp. 1-2.

3rd Generation Partnership Project (3GPP), R2-1701331, "Paging in NR with Beam Sweeping", 3GPP TSG-RAN WG2 Meeting #97, MediaTek Inc., Athens, Greece, Feb. 13-17, 2017, pp. 1-4.

3rd Generation Partnership Project (3GPP), TR 37.842 V1.8.0, "Technical Specification Group Radio Access Network, E-UTRA and UTRA, Radio Frequency (RF) Requirement Background for Active Antenna System (AAS) Base Station (BS) (Release 13)", Oct. 2015, pp. 1-46.

3rd Generation Partnership Project (3GPP), TR 38.913 V14.1.0, "Technical Specification Group Radio Access Network, Study on Scenarios and Requirements for Next Generation Access Technologies (Release 14)", Dec. 2016, pp. 1-38.

* cited by examiner

BEAMFORMED PAGING TRANSMISSION

CROSS-REFERENCE TO RELATED APPLICATIONS

This application is the National Stage entry under 35 U.S.C. § 371 of Patent Cooperation Treaty Application PCT/US2018/023363, filed Mar. 20, 2018; which claims the benefit of U.S. Provisional Patent Application No. 62/474,867 filed on Mar. 22, 2017; and U.S. Provisional Patent Application No. 62/543,126, filed on Aug. 9, 2017; the contents of all of which being hereby incorporated by reference as if fully set-forth herein in their respective entirety, for all purposes.

BACKGROUND

Mobile communications continue to evolve. A fifth generation may be referred to as 5G. A previous (legacy) generation of mobile communication may be, for example, fourth generation (4G) long term evolution (LTE). Mobile wireless communications implement a variety of radio access technologies (RATs), such as New Radio (NR) or 5G flexible RAT. Use cases for NR may include, for example, extreme Mobile Broadband (eMBB), Ultra High Reliability and Low Latency Communications (URLLC) and massive Machine Type Communications (mMTC).

SUMMARY

Systems, methods, and/or instrumentalities are disclosed for beamformed paging. A TRP may transmit a paging inquiry signal using beam sweeping in a paging inquiry (PI) block with a different time, frequency resource set and/or sequence configuration associated with the same paging occasion (PO), for example, to randomize and/or distribute WTRUs into different monitoring groups. A WTRU may transmit an uplink paging inquiry response indicating a downlink beam for a paging data transmission and/or a WTRU ID. A downlink control or/data channel transmission may be triggered by a paging inquiry response transmission. Paging downlink control information (DCI) may be transmitted in a WTRU-specific control channel, which may contain CRC bits masked by a temporary paging identity, e.g., based on a WTRU ID that may be reported in a paging inquiry response transmission. A WTRU paging procedure may be based on a paging inquiry signal and/or response transmission (e.g., stand-alone or non-stand-alone with synchronization signal (SS) block). Error handling may be used to improve paging reliability.

A wireless transmit/receive unit (WTRU) may be in communication with a wireless communication network. The WTRU may comprise a memory. The WTRU may comprise a processor. The processor may be configured to select at least one beamformed synchronization signal block (SSB). The at least one beamformed SSB may be provided by a node of the wireless communication network prior to an occurrence of a paging occasion (PO). The processor may be configured to select a common Paging Inquiry (PI) signal based on the selected at least one SSB. The processor may be configured to select one or more PI parameters. The processor may be configured to determine a first portion of the PO based on the selected one or more PI parameters. The process may be configured to monitor for the common PI signal during the first portion of the PO. The processor may be configured to determine that the common PI signal indicates that a paging transmission is to be directed to the WTRU. The processor may be configured to send a PI response message to the node of the wireless communication network using a first beam. The PI response message may include an indication for a second beam and a WTRU identifier (ID). The WTRU may comprise a receiver. The receiver may be configured at least to receive the paging transmission using the second beam.

A wireless transmit/receive unit (WTRU) may be in communication with a wireless communication network. The WTRU may comprise a memory. The WTRU may comprise a processor. The processor may be configured to select at least one beamformed synchronization signal block (SSB) associated with an occurrence of a paging occasion (PO). The at least one beamformed SSB may be provided by a node of the wireless communication network. The processor may be configured to determine a Paging Inquiry (PI) signal configuration based on the selected at least one SSB and/or a WTRU identifier (ID). The processor may be configured to determine one or more PI signal timing parameters from the PI signal configuration. The processor may be configured to determine a first portion of the PO based on the determined one or more PI timing parameters. The processor maybe configured to monitor for the PI signal during the first portion of the PO. The processor may be configured to detect the PI signal. The processor may be configured to send a PI response to the node of the wireless communication network using a first beam. The PI response may include an indication for a second beam and/or the WTRU ID. The WTRU may comprise a receiver. The receiver may be configured to receive a paging transmission using the second beam.

A wireless transmit/receive unit (WTRU) may be in communication with a wireless communication network. The WTRU may comprise a memory. The WTRU may comprise a processor. The processor may be configured to select at least one beamformed synchronization signal block (SSB) that may be associated with an occurrence of a paging occasion (PO). The processor may be configured to determine a Paging Inquiry (PI) signal configuration based on the selected at least one SSB and/or a WTRU identifier (ID). The processor may be configured to monitor for a PI signal during a first portion of the PO. The timing information to monitor for the PI signal during the PO may be determined based on the PI signal configuration. The processor may be configured to detect the PI signal. The processor may be configured to send a PI response using a first beam. The PI response may include an indication for a second beam and/or the WTRU ID. The WTRU may comprise a receiver. The receiver may be configured to receive a paging transmission using the second beam.

DETAILED DESCRIPTION

A detailed description of illustrative devices, systems, and/or techniques will now be described with reference to the various Figures. Although this description provides a detailed example of possible implementations, it should be noted that the details are intended to be examples and in no way limit the scope of the application.

Figure 1A:
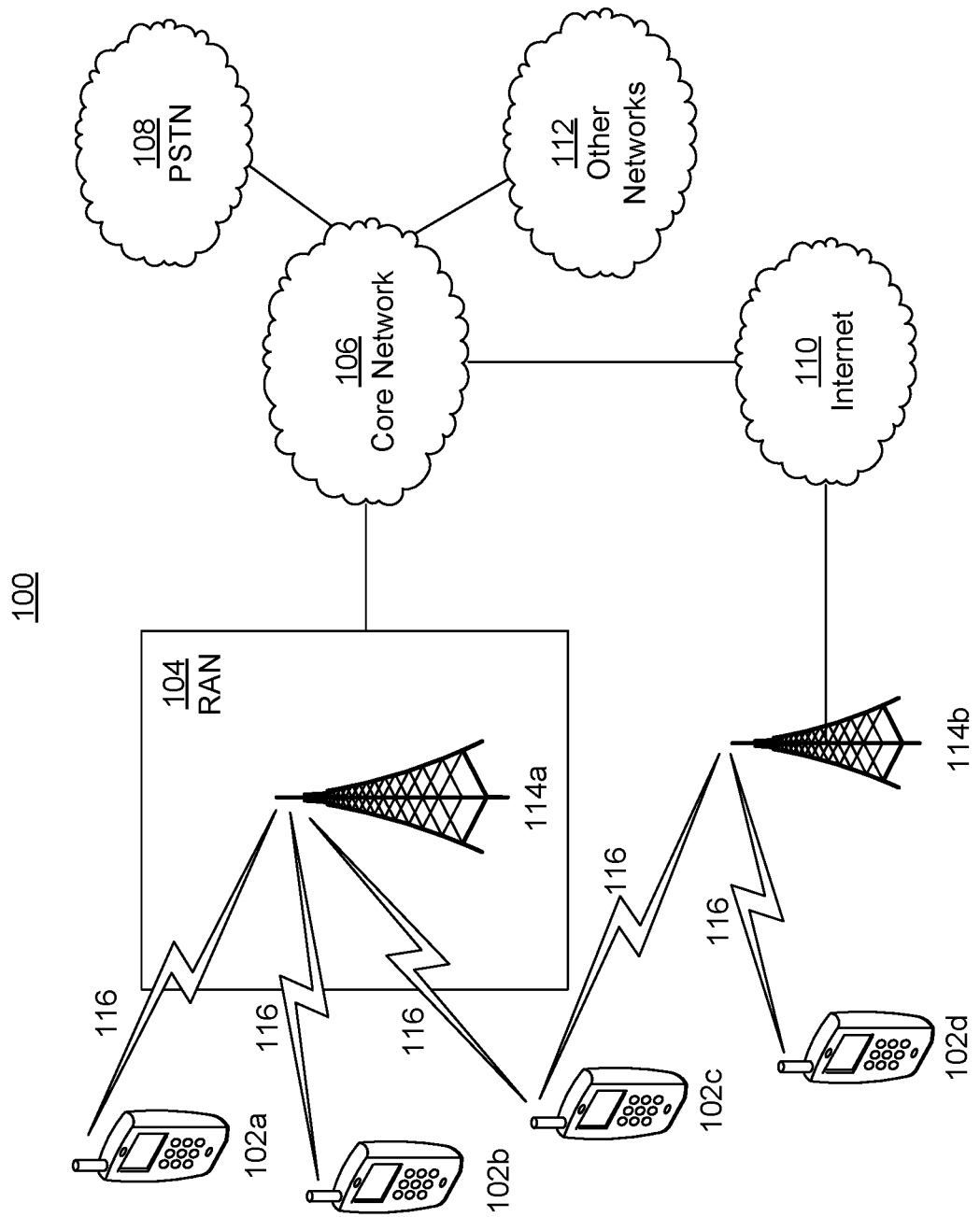
FIG. 1A is a system diagram illustrating an example communications system in which one or more disclosed devices, systems, and/or techniques may be implemented.

FIG. 1A is a diagram illustrating an example communications system 100 in which one or more disclosed devices, systems, and/or techniques may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed devices, systems, and/or techniques contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one or more devices, systems, and/or techniques, the base station 114a may include three transceivers, i.e., one for each sector of the cell. In one or more devices, systems, and/or techniques, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In one or more devices, systems, and/or techniques, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In one or more devices, systems, and/or techniques, the base station 114a and the WTRUs 102a, 102b, 102c may implement a radio technology such as NR Radio Access, which may establish the air interface 116 using New Radio (NR).

In one or more devices, systems, and/or techniques, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other devices, systems, and/or techniques, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one or more devices, systems, and/or techniques, the base station 114b and the WTRUs 102c, 102d may implement a radio technology such as IEEE 802.11 to establish a wireless local area network (WLAN). In one or more devices, systems, and/or techniques, the base station 114b and the WTRUs 102c, 102d may implement a radio technology such as IEEE 802.15 to establish a wireless personal area network (WPAN). In one or more devices, systems, and/or techniques, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
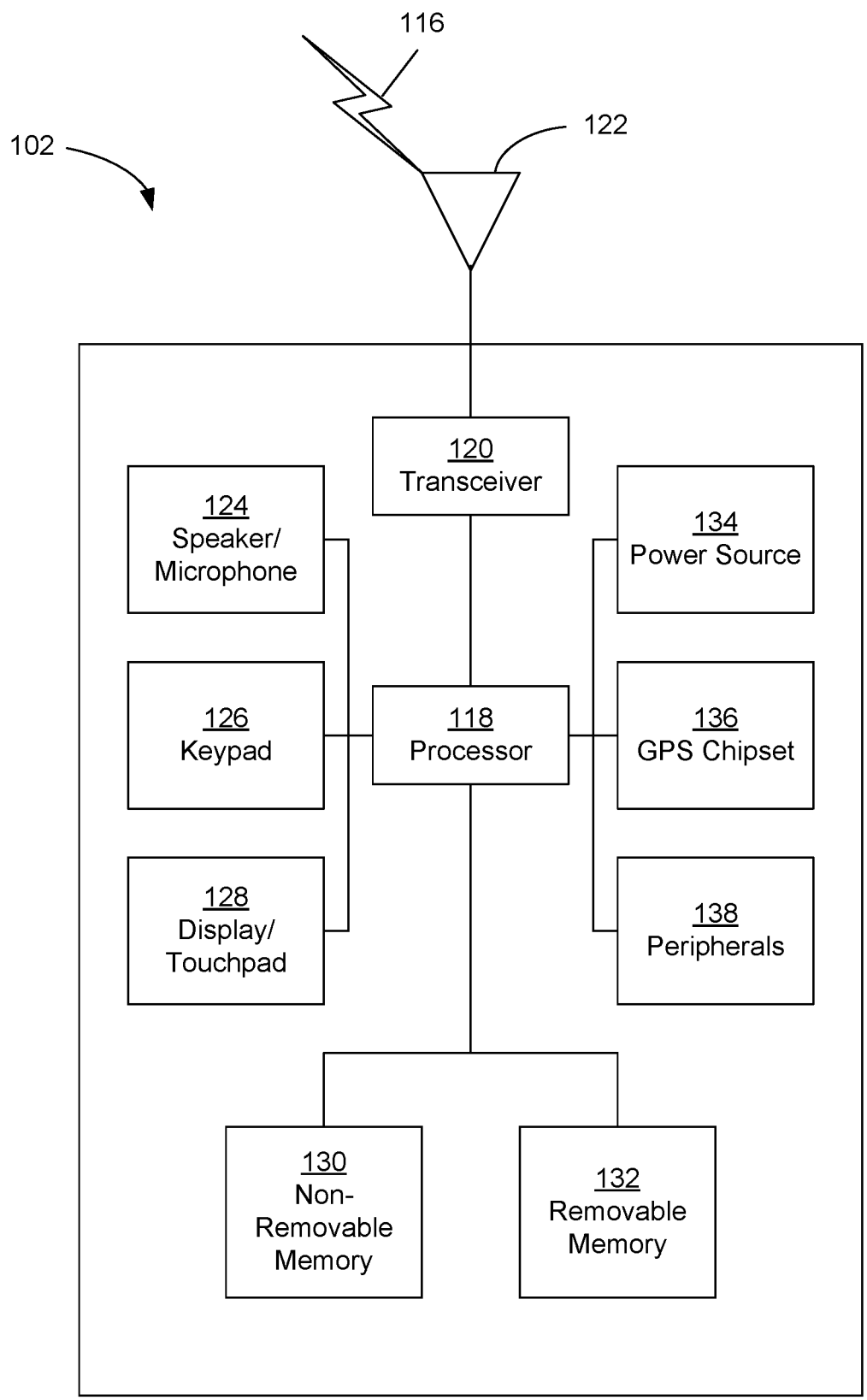
FIG. 1B is a system diagram illustrating an example wireless transmit/receive unit (WTRU) that may be used within the communications system illustrated in FIG. 1A according to one or more devices, systems, and/or techniques.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with one or more devices, systems, and/or techniques.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one or more devices, systems, and/or techniques, the transmit/receive element 122 may be an antenna configured to transmit and/or receive RF signals. In one or more devices, systems, and/or techniques, the transmit/receive element 122 may be an emitter/detector configured to transmit and/or receive IR, UV, or visible light signals, for example. In one or more devices, systems, and/or techniques, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. In one or more devices, systems, and/or techniques, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other devices, systems, and/or techniques, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with one or more devices, systems, and/or techniques.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In one or more devices, systems, and/or techniques, the WRTU 102 may include a half-duplex radio for which transmission and reception of some or all of the signals (e.g., associated with particular subframes for either the UL (e.g., for transmission) or the downlink (e.g., for reception)).

Figure 1C:
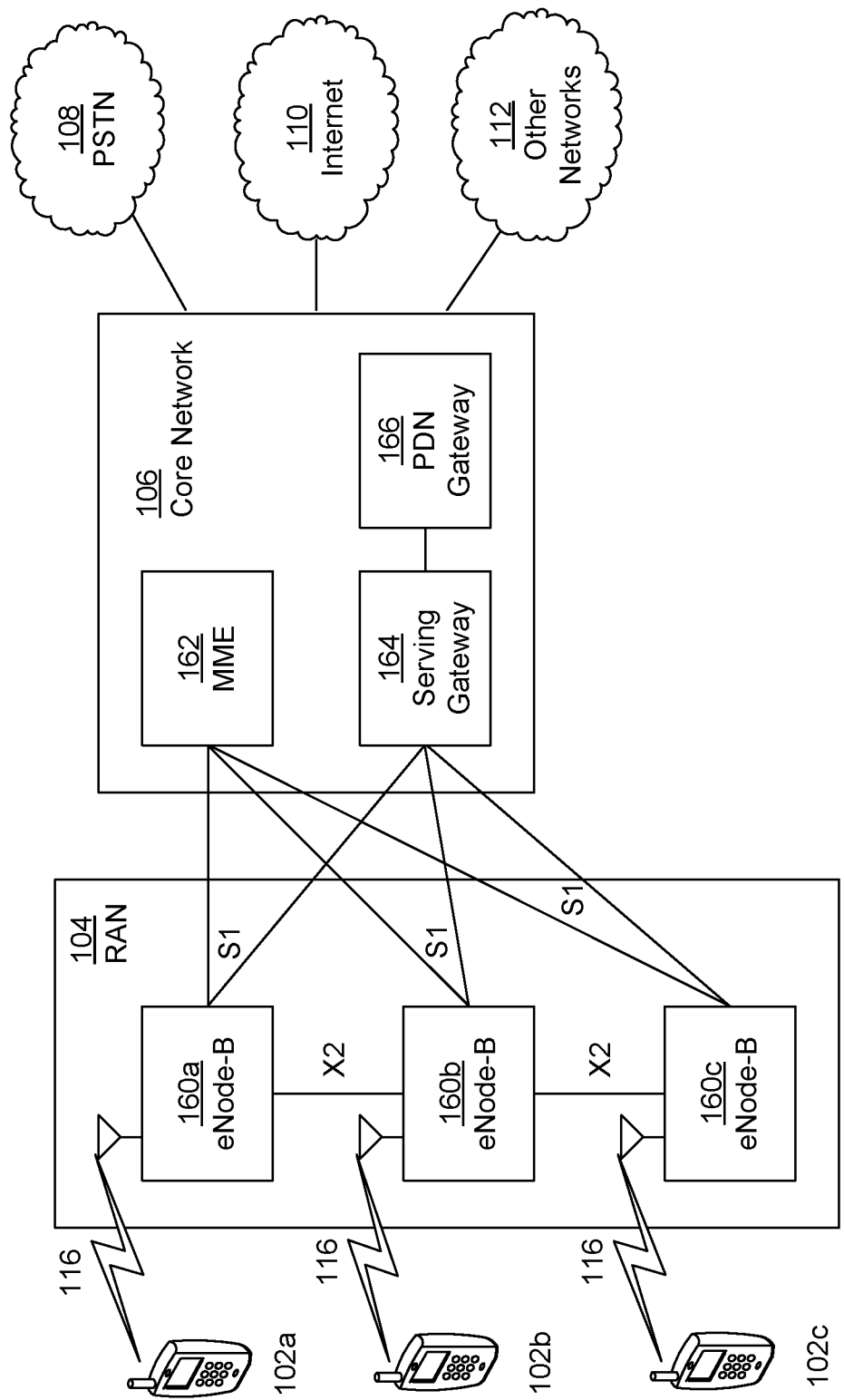
FIG. 1C is a system diagram illustrating an example radio access network (RAN) and an example core network (CN) that may be used within the communications system illustrated in FIG. 1A according to one or more devices, systems, and/or techniques.

FIG. 1C is a system diagram illustrating the RAN 104 and the CN 106 according to one or more devices, systems, and/or techniques. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with one or more devices, systems, and/or techniques. The eNode-Bs 160a, 160b, 160c may each include one or more transceivers for communicating with the WTRUs 102a, 102b, 102c over the air interface 116. In one or more devices, systems, and/or techniques, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW)

166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in one or more devices, systems, and/or techniques that such a terminal may use (e.g., temporarily or permanently) wired communication interfaces with the communication network.

In one or more devices, systems, and/or techniques, the other network 112 may be a WLAN.

A WLAN in Infrastructure Basic Service Set (BSS) mode may have an Access Point (AP) for the BSS and one or more stations (STAs) associated with the AP. The AP may have an access and/or an interface to a Distribution System (DS) and/or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In one or more devices, systems, and/or techniques, the DLS may use an 802.11e DLS and/or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In one or more devices, systems, and/or techniques, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. In one or more devices, systems, and/or techniques, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
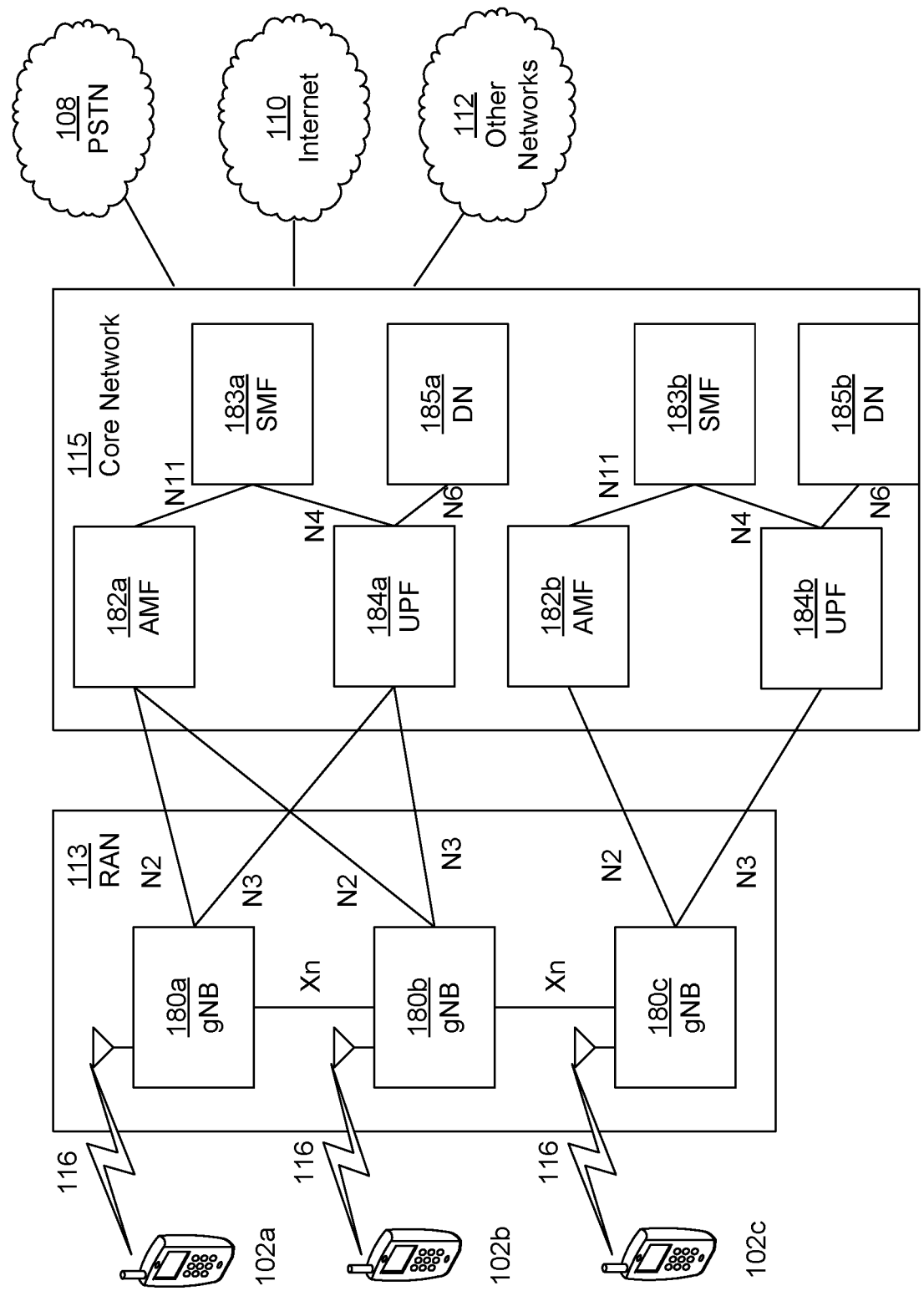
FIG. 1D is a system diagram illustrating a further example RAN and a further example CN that may be used within the communications system illustrated in FIG. 1A according to one or more devices, systems, and/or techniques.

FIG. 1D is a system diagram illustrating the RAN 113 and the CN 115 according to one or more devices, systems, and/or techniques. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with one or more devices, systems, and/or techniques. The gNBs 180a, 180b, 180c may each include one or more transceivers for communicating with the WTRUs 102a, 102b, 102c over the air interface 116. In one or more devices, systems, and/or techniques, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In one or more devices, systems, and/or techniques, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In one or more devices, systems, and/or techniques, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTI) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one or more devices, systems, and/or techniques, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU may be configured to access 5G (e.g. NR) 5G systems using one or more beam-based radio access techniques. Large bandwidths available at high frequencies, e.g., at cmW and/or mmW frequencies, may be leveraged to provide high data rates for cellular communication systems such as 5G.

Propagation characteristics of high frequencies may be unfavorable for wireless communication, e.g., in an outdoor environment. Higher frequency transmissions may experience higher free space path loss. Rainfall, atmospheric gases, e.g., Oxygen, and/or foliage may further attenuate high frequency transmissions compared to sub-6 GHz frequencies. Penetration and/or diffraction attenuation may become more severe at mmW frequencies.

Propagation characteristics may result in significant Non Line-Of-Sight (NLOS) propagation path loss. For example, NLOS path loss for mmW frequencies may be more than 20 dB higher than Line-Of-Sight (LOS) path loss, which may severely limit the coverage of mmW transmissions. Satisfactory cellular coverage may be achieved, for example, with the help of beamforming techniques. Beamforming gain may provide coverage for cellular control signaling and/or may boost link capacity to achieve higher data throughput in LOS conditions.

Channel propagation characteristics and/or high data throughput requirements of a cellular system (e.g., a 5G NR system) may lead to specific implementations.

For example, a system (e.g., a 5G NR system) may use beamforming on (e.g., one or more, or all) physical layer signals and/or channels, which may include those for broadcast and/or common control. A system may enable a beamformed access link with beamforming for one or more, most, or all physical layer signals and/or channels. Physical layer signals and/or channels may apply different beamforming techniques (e.g., digital, analog and/or hybrid beamforming) and/or may have a specific beamforming configuration.

A system may use beam-based and/or beam-centric procedures. Beamforming may provide an additional degree of freedom in the angular domain, for example, compared to conventional cellular systems. A system may take into account beamforming and/or beam-based features that may be specific to one or more, or each, physical layer signal and/or channel. A system may incorporate corresponding control and/or maneuvering into one or more system procedures (e.g., uplink transmission, cell search, random access, control channel decoding).

Beamforming techniques may include digital, analog and/or hybrid beamforming.

Digital beamforming antenna elements may (e.g., one or more, or each) have a dedicated RF chain, which may include RF processing and/or ADC/DAC. A signal processed by a (e.g., one or more, or each) antenna element may be controlled (e.g., independently) in phase and/or amplitude, e.g., to optimize channel capacity. For example, the number of RF chains may be equal to the number of antenna elements. Digital beamforming may offer very high performance, although there may be trade-offs in cost, complexity and/or energy consumption.

Analog beamforming may apply an RF chain for a number of antenna elements that may constitute a Phase Antenna Array (PAA). An (e.g., one or more, or each) antenna element may have a phase shifter that may be used to set a phase-only weight for beamforming and/or steering of an antenna pattern of a PAA. For example, the number of applied RF chains may be significantly lower than the number of antenna elements. The number of RF chains may be the same or lower than the number of PAAs. For example, multiple PAAs may be connected to a single RF chain. A (e.g., one or more, or each) PAA may have antenna patterns of specific azimuth and/or elevation coverage. An RF chain may be switched to one PAA at a time. A single RF chain with multiple PAAs may provide broad coverage, for example, by using one beam at a different direction at a different time instance.

Figure 2:
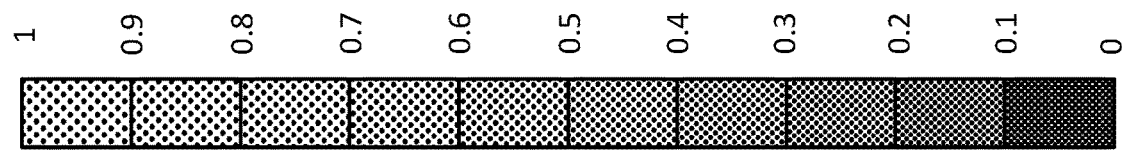
FIG. 2 is an example of a WTRU transmit beam 3D pattern using a 4×4 uniform linear array.
Figure 2:
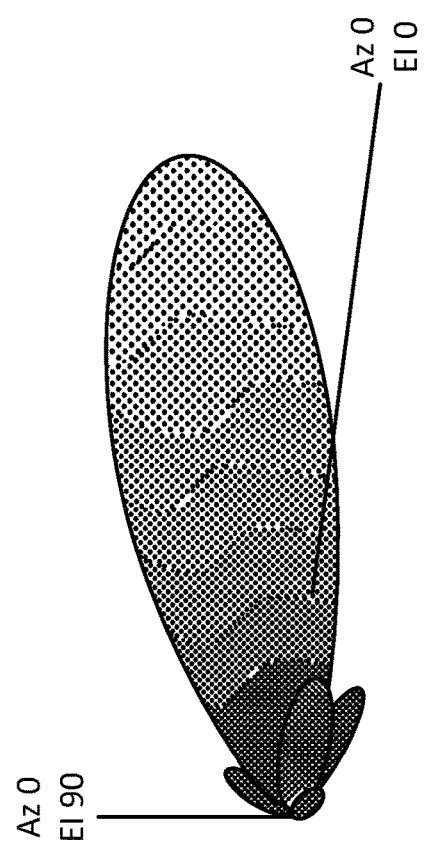

FIG. 2 is an example of a WTRU transmit beam 3D pattern using a 4×4 uniform linear array.

Hybrid beamforming may combine digital precoding and analog beamforming. Analog beamforming may be performed over antenna elements of a PAA connected to an (e.g., one) RF chain. Digital precoding may be applied to a baseband signal for an (e.g., one or more, or each) RF chain and/or its associated PAA. A configuration of hybrid beamforming may include a number of data streams, a number of RF chains, a number of PAAs, and/or a number of antenna elements. A PM connected to an RF chain may be represented by an antenna port that may be (e.g., uniquely) identified by a beamformed reference signal specific to the antenna port.

Figure 3:
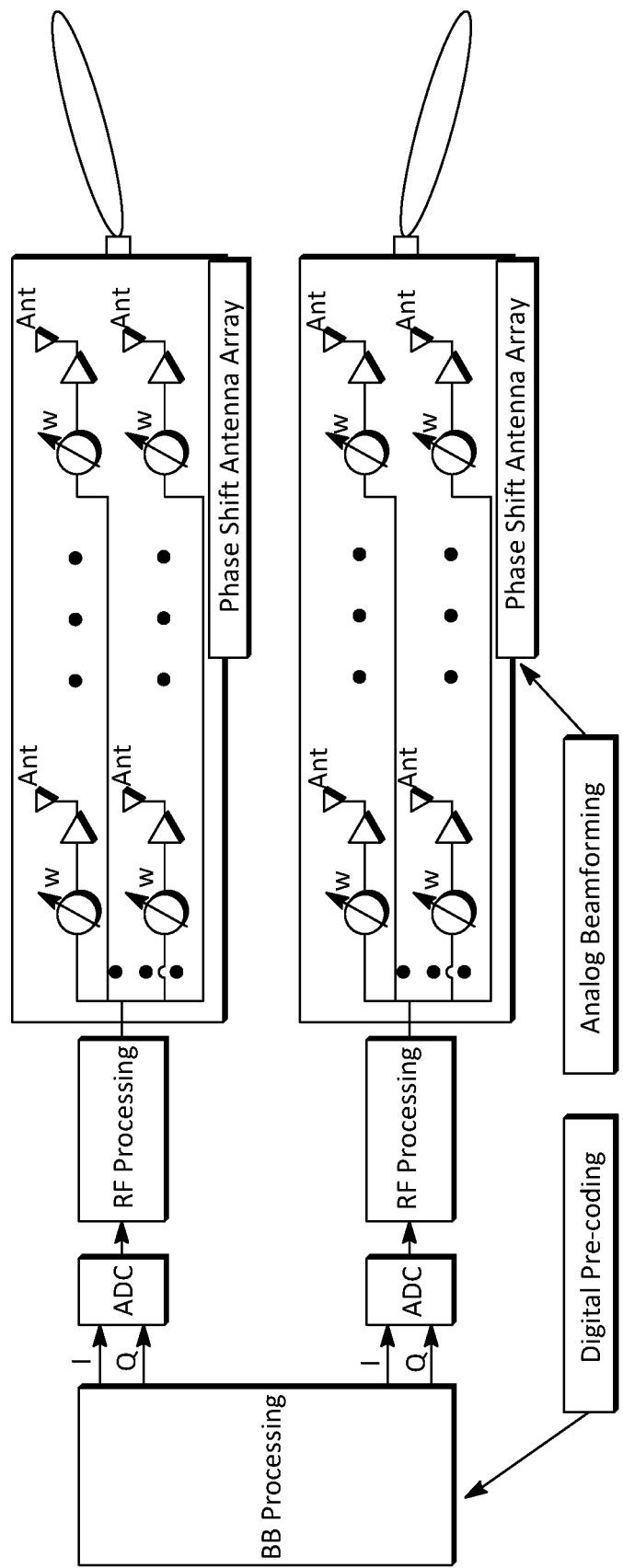
FIG. 3 is an example of WTRU transmit hybrid beamforming with two transceivers (TRX) and two phase antenna arrays.

FIG. 3 is an example of WTRU transmit hybrid beamforming with two transceivers (TRX) and two phase antenna arrays.

NR system implementation may be influenced, for example, by high implementation cost and/or energy consumption of digital beamforming techniques. For example, 5G NR beamforming may be based on hybrid beamforming. The number of TRX per 5G NR node may be considerably lower than the number of antenna elements. Analog beamforming may have significant impact on L1/L2/L3 system procedures and/or may lead to new (e.g., fresh and/or heretofore unpracticed) procedural behaviors and/or sequences. Beamformed transmission may offer a high degree of flexibility to an eNB to customize transmissions in time and/or spatial domain, for example, to reduce signal overhead, and/or energy consumption.

LTE communication systems may utilize physical layer (PHY) procedures for paging signal transmission and/or reception. A paging procedure may be used by a network to request establishment of an NAS signaling connection to a WTRU. For example, a WTRU in IDLE mode may receive downlink data. A Mobility Management Entity (MME) may send a paging message to one or more (e.g., all) eNBs in its current tracking area. The eNBs may page the WTRU over the radio interface. A WTRU may (e.g., upon receipt of a paging message) perform a service request procedure, which may result in transition to an ECM-CONNECTED state. A WTRU may (e.g., also) receive a paging transmission during CONNECTED mode that may be intended for a System Information (SI) update.

Downlink paging data (e.g., in an LTE PHY paging transmission procedure) may be transmitted in a dynamically scheduled PDSCH. An associated PDCCH may be scrambled with P-RNTI, which may be common to multiple (e.g., all) WTRUs. A WTRU may monitor and/or receive a paging transmission during a Paging Occasion (PO) within a Paging Frame (PF). A (e.g., one or more) PO may be a sub-frame that may contain a PDCCH that may have CRC scrambled with P-RNTI, e.g., to address a paging message, and/or may be defined in terms of SFN and/or a sub-frame index.

A WTRU in IDLE mode may monitor, for example, one (or more) PO per DRX cycle. A PF and/or PO for monitoring may be determined, for example, based on WTRU ID (IMSI) and/or DRX parameters (DRX cycle) that may be provided in a System Information (SI) message. A maximum number of POs (e.g., four) may be defined per radio frame. POs may be transmitted (e.g., only) in sub-frames 0, 4, 5, and/or 9.

An LTE PHY layer paging transmission procedure may include, for example, one or more of the following features: paging transmission that may be contained within PF and/or PO; monitoring of paging DCI that may be carried in PDCCH in common search space over the entire system bandwidth, e.g., using P-RNTI de-scrambling; and/or decoding paging data in PDSCH, e.g., based on paging DCI received in PDCCH.

NR may support beam sweeping for paging transmission in multi-beam operation. Reusing and/or repeating an LTE PHY layer paging transmission procedure in one or more, or each, swept beam may cause one or more of the following: downlink transmission overhead; WTRU receiver processing; and/or dependence on an NR SS block.

For example, in downlink transmission overhead, NR paging beam sweeping may involve (e.g., require) repetition of PDCCH and/or PDSCH transmission for paging of a (e.g., single) WTRU in (e.g., one or more, or all) downlink beams. Resulting downlink transmission overhead may include required additional time resource allocation (e.g., symbols, slot, TTI and/or sub-frame), frequency resource allocations (e.g., sub-carrier, PRBs and/or PRB blocks) and/or transmit power for repeating in one or more, or each, beam. Downlink transmission overhead may depend on, for example, number of beams configured for beam sweeping, number of WTRUs supported for paging in one or more, or each, beam, number of bits of paging transmission of one or more, or each, WTRU, number of bits supported by one or more, or each, symbol based on numerology, frequency resource allocation at one or more, or each, symbol, etc.

For example, in WTRU receiver processing, LTE paging may be based on LTE PDCCH common search space (CCS) decoding using, for example, P-RNTI and/or PDCCH CCS spans over an entire system bandwidth. NR may have significantly larger system bandwidth. An NR WTRU paging operation over an entire system bandwidth may cause high WTRU battery consumption due to, for example, use of a broad band ADC. A WTRU may limit processing bandwidth for paging reception, e.g., during DRX. An LTE WTRU may perform, for example, up to 12 blind decoding attempts in CSS to decode a paging PDCCH. NR WTRU receiver processing for paging reception can be simplified.

For example, in dependence on an NR SS block, an LTE WTRU may obtain a timing and/or frequency reference on PSS/SSS. A WTRU may decode PDCCH for paging transmission using, for example, CRS as DMRS. The same procedure may imply that an NR WTRU paging reception may depend on an NR SS block.

NR may implement an ability to provide a sufficiently granular network with discontinuous transmission when there may be no data to transmit and/or network availability may be maintained.

NR may implement an ability to provide operator flexibility to adapt sleep durations of base stations depending on, for example, load, services and/or area.

NR SS block transmission may be sparse and/or may (e.g., thereby) increase WTRU synchronization time with NR SS block before being able to access paging channels. This dependency may reduce WTRU sleep time during DRX and/or may increase WTRU battery consumption.

Reliability of a paging function in the presence of beamforming may be ensured.

The term "beam" may be used to refer to one or more of the following: a set of pre-coding weights or co-phasing weights that may be applied to antenna elements in a WTRU and/or in network equipment (e.g., TRP) for reception and/or transmission; an antenna and/or radiation pattern that may result from application of pre-coding and/or co-phasing weights; a set of properties that may be associated with an antenna pattern, such as a gain, directivity, beam width, beam direction (e.g., with respect to a plane of reference) in terms of azimuth and/or elevation and/or peak to side lobe ratio; at least one antenna port that may be associated with a beam; at least one reference signal that may be transmitted while applying a set of pre-coding weights to antenna elements; at least one sequence that may be used to generate a reference signal; and/or an associated number and/or configuration of antenna elements (e.g., uniform linear array and/or uniform rectangular array).

One or more beam sweeping techniques may be utilized by a network node (e.g., gNB) for transmitting downlink paging inquiry (PI) transmission(s). A TRP may transmit a downlink paging inquiry signal, for example, using beam sweeping during a Paging Occasion, e.g., prior to transmission of paging control and/or data. A paging inquiry signal may be transmitted specific to a (e.g., one or more, or each) downlink transmit beam. Beam-specific PI signals may constitute a Paging Inquiry (PI) block (e.g., as shown by example in FIG. 4).

Figure 4:
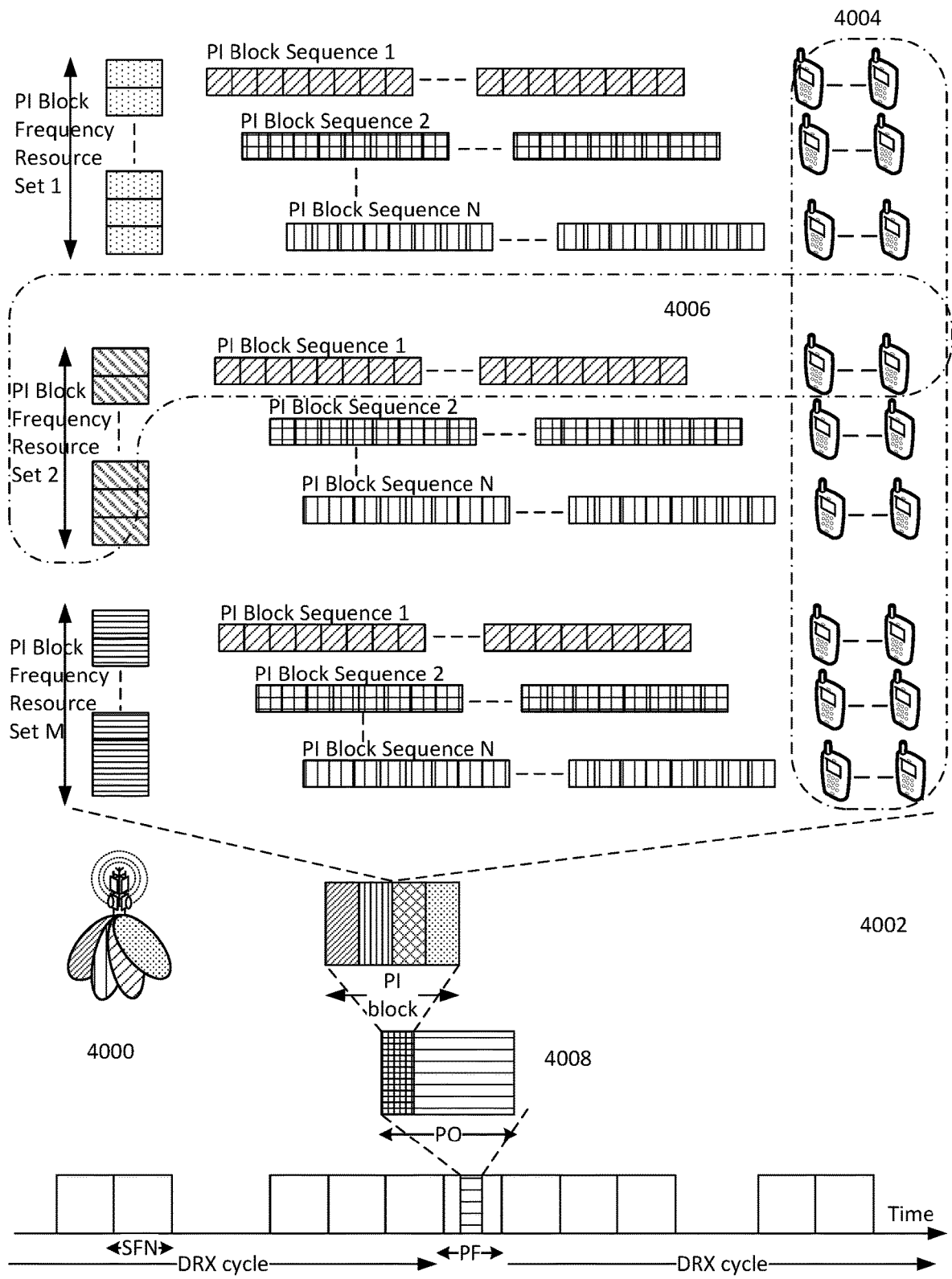
FIG. 4 is an example of WTRU monitoring of a Paging Inquiry (PI) block in a Paging Occasion (PO) based on a configured frequency resource set and/or sequence.

FIG. 4 is an example of WTRU monitoring of a PI block in a PO based on a configured frequency resource set and/or sequence.

A WTRU may be configured to receive a paging inquiry signal. A WTRU may be configured with a maximum time during which it may (e.g., shall) successfully receive a paging message while the WTRU may be camping on a cell. A time may be tracked and/or realized by a timer, which may be started, for example, upon reselection to a new cell that may support a paging procedure. A timer may be restarted, for example, upon reception of a paging message (e.g., independent of whether a paging message may be for a concerned WTRU). A WTRU may determine upon timer expiration that a paging inquiry procedure may be (e.g., is) unsuccessful. A WTRU may perform one or more actions (e.g., error handling actions), for example, when the WTRU determines that a paging procedure may be unsuccessful.

A paging inquiry signal may, for example, consist of a sequence with a good auto- and cross-correlation property. For example, a sequence may be based on a ZC sequence, Gold sequence, etc. A WTRU may detect a paging inquiry signal, for example, by correlation with pre-configured paging inquiry sequences at a pre-configured time and/or frequency resource allocation.

For example, a WTRU may receive a paging inquiry signal using an unscheduled PHY channel (e.g., a primary and/or secondary broadcast channel, a common group control channel and/or a downlink control channel). A WTRU may decode a paging inquiry, for example, by using a pre-defined time and/or frequency resource configuration, modulation and coding scheme and/or scrambling configuration.

A paging inquiry signal may be based on a specific waveform and/or modulation, e.g., On/Off keying. A WTRU may receive a paging inquiry, for example, by energy detection schemes at a pre-configured time and/or frequency resource allocation.

A paging inquiry signal may provide a timing and/or frequency reference. A WTRU may determine a timing and/or frequency reference from reception of a paging inquiry signal. A paging inquiry signal (e.g., in a stand-alone paging inquiry transmission) may enable (e.g., independent) WTRU downlink timing and/or frequency synchronization without requiring synchronization with a downlink system transmission, such as downlink synchronization signals and/or associated reference signals (e.g., SS block). A WTRU may (e.g., in this configuration) decode a subsequent paging transmission, for example, based on paging inquiry signal synchronization. A stand-alone paging inquiry transmission may improve WTRU battery consumption, for example, by detaching a paging procedure from system synchronization block reception, which may avoid wasteful WTRU processing for detecting and/or synchronizing with sparsely configured system synchronization and/or reference signals.

A paging inquiry signal (e.g., in a non-stand-alone paging inquiry transmission) may be associated with one or more of a system synchronization signal and/or system broadcast channel. Its configuration may be transmitted in the system broadcast channel. A WTRU may determine at least a system synchronization signal and/or its configuration from a system broadcast channel. A non-stand-alone paging inquiry signal may be frequency- and/or time-multiplexed with system synchronization signals and/or its associated signals (e.g., SS block). For example, the multiplexing may be performed as one or more of a paging inquiry channel frequency-multiplexed with an SS block and/or a paging inquiry channel time-multiplexed with an SS block (and/or a combination of time and/or frequency multiplexing).

For example, in a paging inquiry channel frequency-multiplexed with SS block, a downlink control channel (e.g., PDCCH and/or another unscheduled PHY downlink control channel carrying the paging inquiry) may be mapped to one or more symbols used for PSS and/or SSS. In the frequency domain, the paging inquiry channel may be mapped to the sub-carriers and/or frequency resource blocks between the edges of PSS/SSS frequency resource allocation and the edges of the PBCH frequency resource allocation. A PBCH frequency resource allocation may be larger than the PSS/SSS frequency resource allocation.

Multiplexing may ensure the paging inquiry channel frequency resource allocation may be (e.g., may always be) within the system minimum bandwidth. The number of paging occasions (PO) available may be limited by the SS block transmission window configuration and/or the SS burst set periodicity. Accordingly, the network may have limited flexibility to configure the PO based on the paging load.

For example, in a paging inquiry channel time-multiplexed with SS block, a downlink control channel (e.g., PDCCH and/or an unscheduled PHY downlink control channel carrying the paging inquiry) may be mapped at different symbol locations than an SS block. The symbol location used for the paging inquiry channel and/or the SS block may be in the same or different slot, same or different sub-frame, same or different frame, etc. depending on the beam sweeping configurations of one or more of the paging indication transmission and/or SS block.

A WTRU may derive the resource configuration (e.g., time/frequency/code/spatial resource allocation) of the PI channel based on one or more of the WTRU ID, DRX cycle, and/or a pre-configured association with the SS block. The time-multiplexing may allow an independent beam sweeping configuration for the paging inquiry transmission. The time-multiplexing may enable a PO configuration based on an SS block burst set configuration.

The time-multiplexing may (e.g., may also) allow a WTRU to perform receive beam sweeping and/or identify a downlink beam (e.g., the downlink beam with the best received quality), for paging inquiry monitoring and/or reception prior to the beginning of PO. For example, a WTRU may identify a downlink beam based on received SS block before a PO and/or apply an association (e.g., a pre-configured association, an association acquired from the PBCH of the received SS block, etc.) to locate and/or decode a PDCCH and/or an unscheduled PHY downlink control channel carrying the paging inquiry transmission during the PO. The time period during a PO for a WTRU to search and/or acquire a downlink beam may be reduced (e.g., significantly) using such a method.

An association between a downlink control channel (e.g., PDCCH and/or an unscheduled PHY downlink control channel carrying the paging inquiry) may include one or more of the following: spatial QCL relationship between SS block and paging inquiry channel, for example the SS block and paging inquire transmission may be (e.g., always) spatially QCL'd (e.g., a beam-specific association); timing relationship between SS block and the symbols allocated for PI channel, for example number of symbols/slots/sub-frames; relationship between SS block and PI beam sweeping, for example one's periodicity is an integer multiple of the other's periodicity; indication of the frequency resource allocation of the PI channel, for example a CORSET and/or frequency resource block configuration; indication of time duration of the PI channel, for example, a number of symbols; and/or indication of sequence used for PI detection and/or decoding, for example a paging inquiry sequence and/or a DMRS sequence for paging inquiry decoding. The association may be pre-configured and/or included in a system broadcast channel (e.g., PBCH).

Information content of a paging inquiry may include, for example, an indicator of an upcoming paging transmission, one or more group identities, and/or a resource configuration of the paging transmission. For example, a paging inquiry signal may provide an indication to a WTRU regarding an upcoming paging transmission within the same beam in which a PI signal may be received. In an (e.g., another) example, a paging inquiry signal may indicate an upcoming system information update.

A WTRU may (e.g., only) attempt to receive a paging transmission, for example, when indicated by a paging inquiry signal. WTRU reception of a paging transmission may involve downlink control channel decoding and/or downlink data channel decoding. Paging inquiry signal reception may be based on, for example, sequence and/or energy detection and/or small payload reception, which may use much less WTRU receiver processing and/or battery consumption compared to LTE paging reception based on PDCCH and/or PDSCH decoding.

A paging inquiry signal may indicate whether an uplink paging inquiry response transmission may or might not be requested. A paging inquiry signal may (e.g., further) indicate time/frequency resources for transmission of a paging inquiry response transmission. For example, a paging inquiry signal may include downlink control information that may (e.g., explicitly) indicate time and/or frequency resource configuration and/or scheduling information of a paging data transmission.

A WTRU may compute/determine/identify a paging group to which the WTRU belongs/is a member. Such a paging group could be used by the WTRU to determine the WTRU's behavior in response to reception of a paging inquiry response. For example, a WTRU may be configured to respond to a paging inquiry if the ID contained in the paging inquiry corresponds to the WTRU's paging group. A WTRU which receives a paging inquiry signal, and/or might not belong to any of group IDs encoded in the paging inquiries, may be allowed to continue DRX operation, for example, until its next DRX cycle and/or next configured occurrence of a paging inquiry signal.

A WTRU may determine the paging group using the portion of its WTRU ID. For example, the WTRU may determine the paging group to be the M most significant bits of the WTRU ID. The value of M may be further configured by the network in system information. A WTRU may further be explicitly configured with a group through network signaling (e.g., broadcast and/or dedicated).

A WTRU may be provided with a configuration for reception of a paging inquiry signal. A paging inquiry signal configuration may include, for example, time resource allocation (e.g., in terms of a number of symbols, mini-slot, slots, sub-frame, etc.), a frequency resource set (e.g., in terms of a sub-carrier index, PRB index, frequency resource set index, control resource set index, etc.), sequence and/or signal structure. A configuration may be based on an arithmetic function, such as a hash function using, for example, WTRU ID (e.g., IMSI), DRX cycle duration, WTRU service type, sub-frame number, sub-frame index and/or PO location.

Functions may be used by a WTRU and/or TRP, for example, to determine a paging inquiry signal configuration. Different functions may be used for a paging inquiry frequency resource set and/or sequence. For example, PO=F (WTRU ID, DRX, etc.), $PI_{time}$=F1(WTRU ID, DRX, etc.), $PI_{frequency}$=F2(WTRU ID, DRX, etc.) and/or $PI_{sequence}$=F3 (DRX, WTRU ID). The function F( ), F1( ), F2( ) and/or F3( ) may, for example, be based on different modular operation and/or input parameters such as a number of symbols, mini-slot and/or slots within the PO, a number of frequency resource sets and/or a total number of paging inquiry sequences configured for a paging inquiry signal transmission. A signal structure (e.g., subcarrier spacing) used for a transmission of a PI may be determined as a function of a PI frequency resource. A WTRU may use a desired, default and/or baseline supported signal structure as an input to functions F1, F2 and/or F3. A set of configuration parameters may be signaled, for example, in system broadcast information. A TRP and WTRU may obtain identical PO/$PO_{time}$/$PO_{frequency}$/$PO_{sequence}$ values. For example, F1( ) may be based on a number of most significant bit (MSB) of a WTRU ID that may be part of an MSB used for a PO function.

System broadcast information may (e.g., also) be used to turn on/off paging inquiry reception and/or paging inquiry response transmission by a WTRU.

Functions F, F1, F2 and/or F3 may be independent from each other. For example, $PI_{time}$ may be related to PO. $PI_{time}$ may be determined, for example, based on PO, e.g., by using a relative timing offset with a PO start as a reference. A time offset may be in terms of a number of symbols, mini-slots, slots, sub-frames, etc. In another example, the $PI_{time}$ may be equal (e.g., exactly equal or substantially equal) to the PO determination by the WTRU.

Separate functions for PO, $PI_{time}$, $PI_{frequency}$ and/or $PI_{sequence}$ determination may randomize and/or distribute WTRUs that may monitor a paging inquiry signal. WTRUs with the same PO may monitor a paging inquiry signal at different time(s) (e.g., $PI_{time}$) within a PO and/or at different frequency resource sets (e.g., $PI_{frequency}$). WTRUs with the same PO, $PI_{time}$ and/or $PI_{frequency}$ may use a different sequence (e.g., $PI_{sequence}$). FIG. 4 shows an example with one or more, or all, WTRUs configured with the same PO. They may be (e.g., further) grouped, for example, into monitoring a paging inquiry signal at a different symbol location, using a different frequency resource set and/or sequence. At 4000, an eNB may transmit PI block(s) in one or more, or each, beam based on PO and/or associated frequency resource set and/or sequence. At 4002, one or more, or all WTRUs may be/monitor in PI block(s) per beam, perhaps for example based on the configured PO(s) and/or associated frequency resource set and/or sequence. At 4004, one or more WTRUs may be/monitor in the DL same beam with same PO, for example. At 4006, one or more WTRUs may be/monitor in the same beam with the same PO and/or the same PI block configuration. At 4008, there is an example of the PO/PI illustration, but one or more PI block(s) locations are contemplated, such as within and/or outside the PO.

Configuration of $PI_{time}$ may, for example, depend on NR system structure parameters, such as a number of symbols per mini-slot/slot/sub-frame, numerology of a paging inquiry signal, a number of beams supported by TRPs, etc. For example, a paging inquiry signal transmission may precede a PO with a pre-configured timing offset relative to a start of a PO. For example, a paging inquiry signal transmission may be transmitted in a beginning and/or any part of a PO with a pre-configured timing offset relative to the start of the PO. A timing offset may be dynamically indicated, for example, in accordance with a use (e.g. need) of a paging inquiry signal transmission. A WTRU may be requested to transmit a paging inquiry response. A longer timing offset may be indicated, for example, to allow WTRU processing for uplink transmission.

A number of paging inquiry frequency resource sets may depend on NR system bandwidth, a number of control resource sets, a number of PRBs assigned for paging transmission, a number of WTRUs in a paging/tracking area, etc. A number of paging inquiry sequence configurations may, for example, depend on a size of an associated frequency resource set, a sequence type, and/or performance characteristics (e.g., how many zero-cross-correlated sequences may be accommodated given a designed sequence length).

In one or more example (e.g., LTE) paging procedure(s), (e.g., one or more, or all) WTRUs that may have the same PO may decode PDCCH, for example, using P-RNTI and/or may detect a paging DCI, for example, when there may be only one WTRU to be paged in the PO. Other WTRUs may (e.g., in this case) decode a paging record in a subsequent PDSCH, for example, to find out they are not intended for the paging, which may waste processing by the other WTRUs. Randomization and/or distribution of WTRUs based on PO, $PI_{time}$, $PI_{frequency}$ and/or $PI_{sequence}$, may avoid similar waste. A group of WTRUs may (e.g., unlikely) be configured with an identical combination of PO, $PI_{time}$, $PO_{frequency}$ and/or $PI_{sequence}$ and/or may be located in the same beam. A beam-specific paging inquiry signal configuration may reduce the number of WTRUs that may detect a paging inquiry signal without a paging message.

Figure 5:
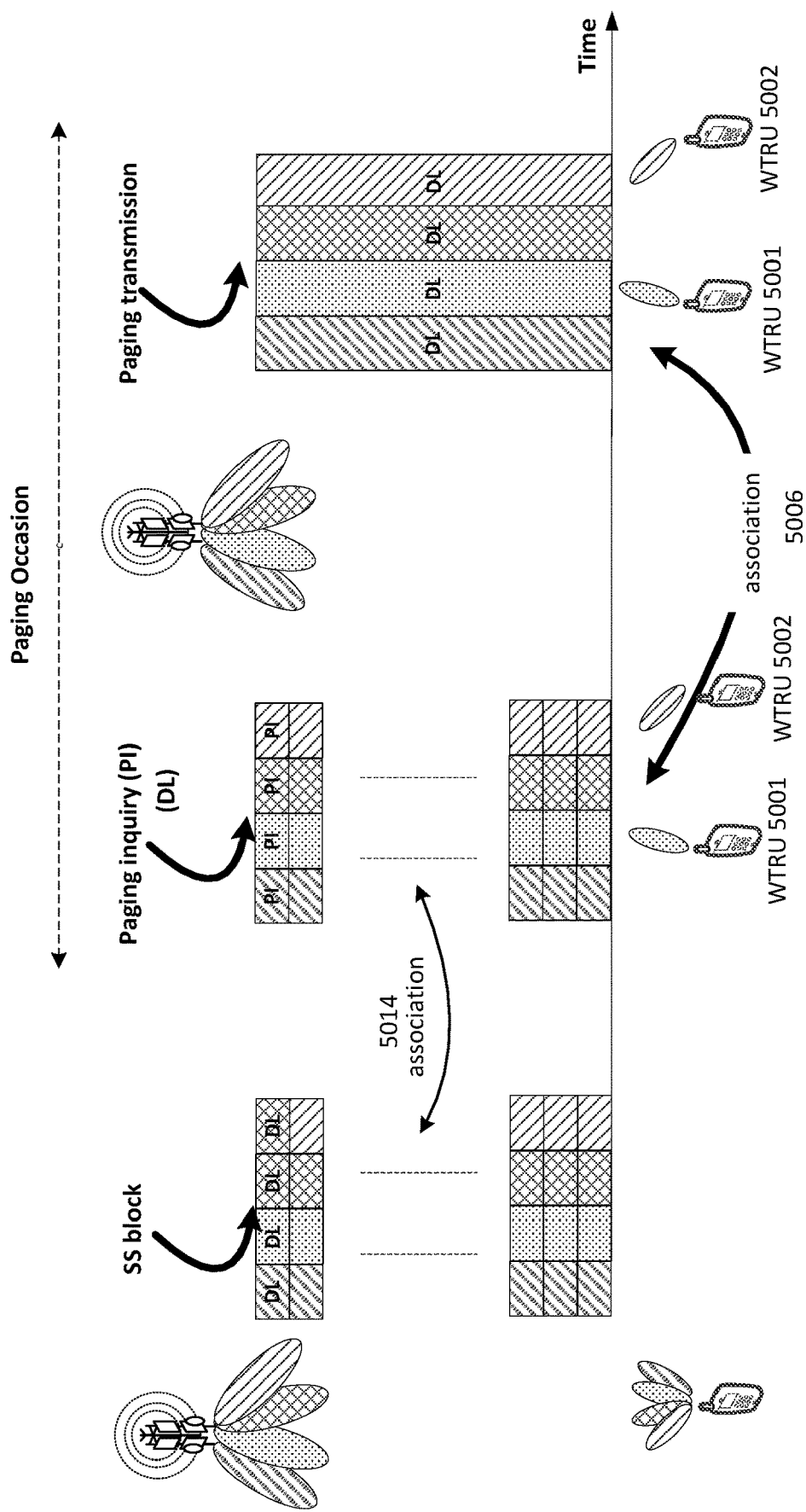
FIG. 5 is an example of a WTRU paging procedure based on an SS block and/or a PI block.

A paging inquiry signal may be explicitly and/or implicitly associated with paging control and/or a data channel transmitted within the same beam (e.g., as shown by example in FIG. 5). An association may include, for example, one or more of a timing relation, frequency resource mapping and/or DMRS determination. For example, WTRU 5001 and WTRU 5002 illustrate, at 5006, an association may include for example, one or more of a timing relation, frequency resource mapping, and/or DMRS determination.

FIG. 5 is an example of a WTRU paging procedure based on an SS block and/or a PI block.

A timing relation may comprise, for example, a pre-defined offset of numbers of symbols, mini-slots, slots from the end of a paging inquiry transmission duration and the start of a paging control and/or data channel. A paging inquiry signal may be within the same beam as an associated paging control and/or data transmission.

Frequency resource mapping may comprise, for example, a pre-defined relation in terms of mapping and/or a look-up table that a WTRU may use to determine a frequency resource allocation of an associated paging control and/or data transmission. For example, a paging inquiry frequency resource set may be the same as a downlink control channel resource set that may carry paging control information. For example, an associated paging data transmission may be unscheduled and/or may use the same frequency resource set as that of a paging inquiry signal.

A DMRS determination may comprise, for example, a pre-defined relation in terms of mapping and/or a look-up table that a WTRU may use to determine a DMRS for associated paging control and/or data transmission. For example, a paging inquiry sequence may be used as a DMRS for associated paging control and/or data transmission.

Figure 8:
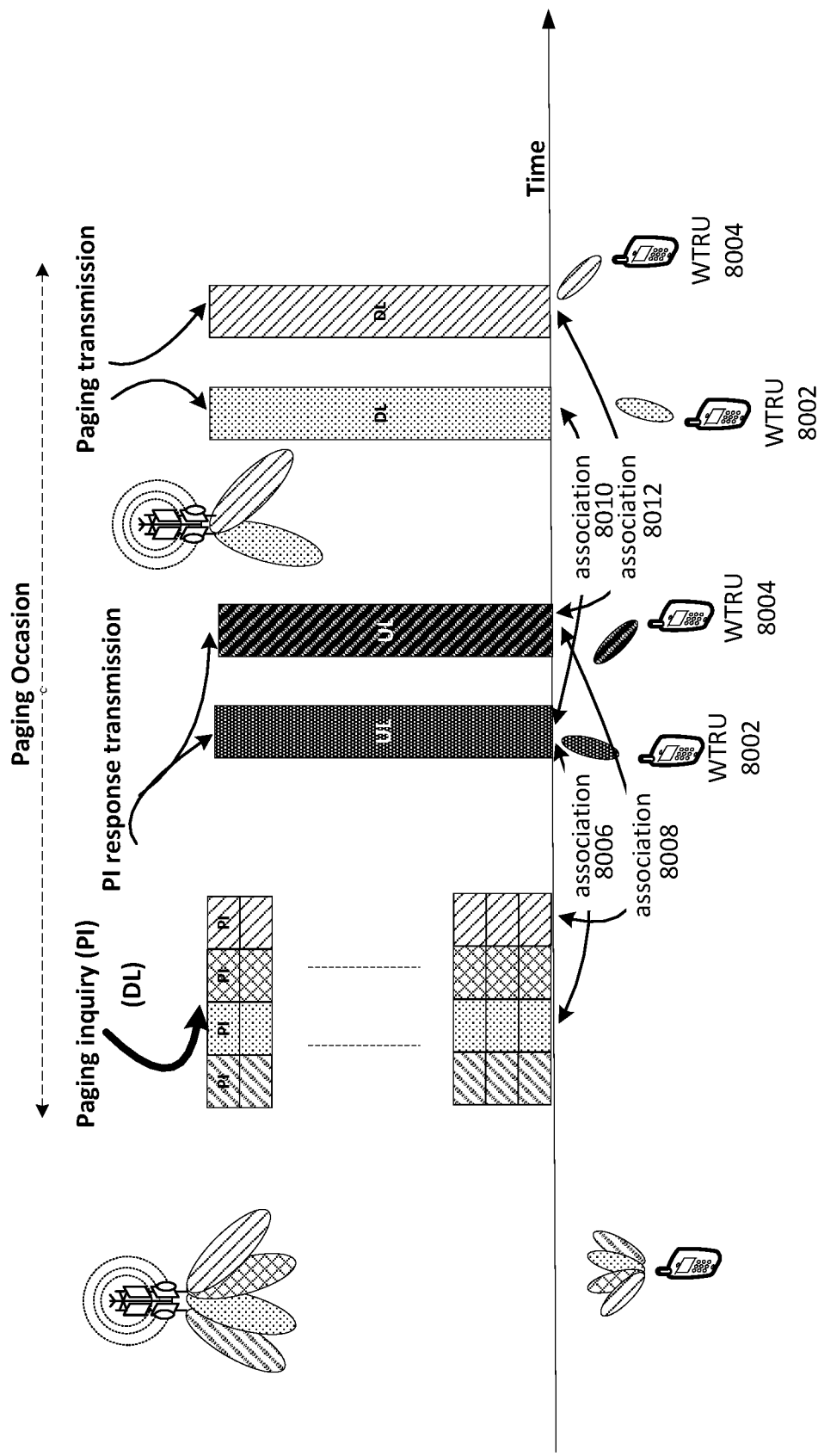
FIG. 8 is an example of a WTRU paging procedure based on a stand-alone PI block with a PI response transmission with a grouped PI block.

A TRP may transmit paging inquiry signals (e.g., consecutively), for example, using beam sweeping (e.g., as shown by example in FIG. 8). Paging inquiry signals (e.g., in this configuration) may be located in a grouped PI block. A WTRU may attempt to receive the paging inquiry signals, for example, using beam sweeping (e.g., as shown by example in FIG. 8). For example, a WTRU may attempt to receive a paging inquiry signal in one or more, or each, of a set of downlink beams transmitted in a PI block. The PI block that may include consecutive time resource units such as symbols and/or mini-slots. A WTRU may receive such configuration for the PI block (e.g., indicating the number and/or location of the consecutive time resource units) in system broadcast information. The WTRU may receive and/or determine the configuration for a grouped PI block based on one or more of the received paging inquiry signal properties, such as the paging inquiry signal sequence type (e.g., the paging inquiry signal type may implicitly indicate the number of consecutive time units).

Figure 9:
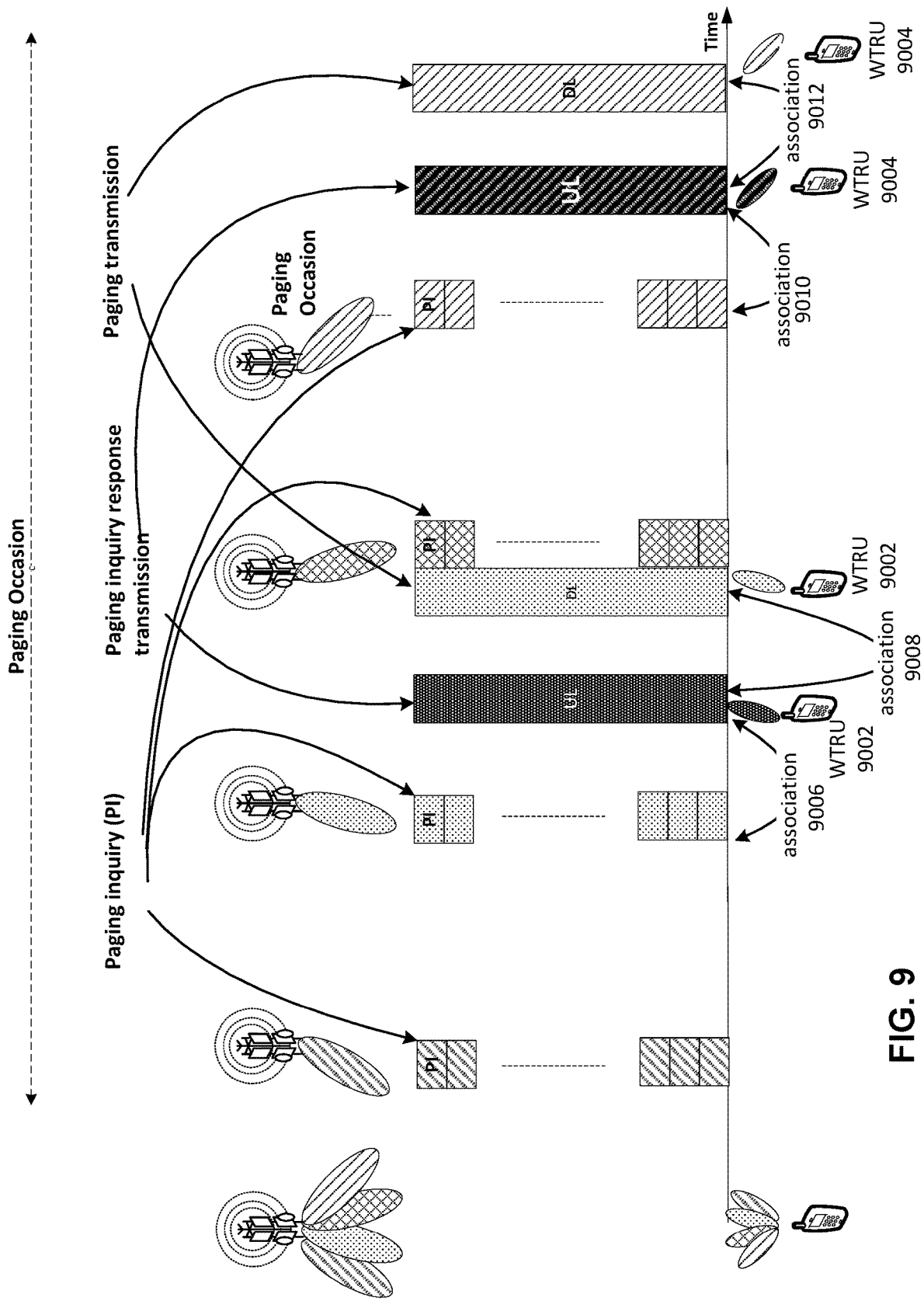
FIG. 9 is an example of a WTRU paging procedure based on a stand-alone PI block with a PI response transmission with a distributed PI block.

For example, a TRP may transmit a paging inquiry signal in one beam at a time (e.g., as shown by example in FIG. 9). This may increase the duration of a PO and/or may result in an additional WTRU wake-up time. Paging inquiry response transmissions associated with a first beam or beams may indicate (e.g., one or more, or all) WTRUs in a paging group may be located in these beams. A TRP (e.g., in this case) might not transmit a paging inquiry signal in other configured beams and/or may reduce transmission overhead. A WTRU may attempt to receive a paging inquiry signal in one or more (e.g., one or more, or each) of a set of downlink beams transmitted in a PI block. The set of downlink beams may include disjointed and/or non-consecutive time resource units such as symbols and/or mini-slots. For example, the non-consecutive time resources may be located with a pre-configured time interval with respect to each other. The time interval may be uniform or non-uniform. The WTRU may receive and/or determine the configuration for a grouped PI block (e.g., a non-consecutive PI block) based on one or more of the received paging inquiry signal properties, such as the paging inquiry signal sequence type (e.g., the paging inquiry signal type may implicitly indicate the configuration/pattern of the non-consecutive time units).

For example, a TRP may transmit paging inquiry signals, for example, using beam sweeping over a subset of beams and/or beams using a larger beamwidth. A TRP (e.g., upon reception of a paging inquiry response) may retransmit a PI in a more refined subset of beams, for example, by increasing beam granularity and/or by reducing beamwidth. A WTRU may use retransmissions, for example, to enable beam acquisition and/or beam refinement and/or to improve future transmissions from a TRP.

For example, a TRP (e.g., upon receiving a paging inquiry response) may transmit a PDCCH associated with a paging message in a subset of more refined beams and/or in a subset of beams with narrower beamwidth (e.g., narrower than an original PI signal). This might not optimize paging channel overhead but may reduce latency and/or enable concurrent beam acquisition.

A WTRU may use one or more techniques to transmit an uplink paging inquiry response transmissions(s). A WTRU may be configured (e.g., in a system information broadcast and/or a higher layer configuration) to transmit an uplink paging inquiry response that may be triggered, for example, by receiving a paging inquiry during a paging occasion. For example, a WTRU may receive an indication whether or not to transmit a paging inquiry response in a physical broadcast channel transmitted in an SS block. A network may determine a need for an uplink paging inquiry transmission based on a number of system configuration parameters, such as one or more of a deployment scenario, number of beams supported by a TRP, number of antenna arrays supported by a TRP, number of WTRUs in a paging/tracking area, current UL vs DL resource usage in a cell, traffic and/or user distribution in a beam coverage, etc.

A WTRU may receive an indication (e.g., carried in a paging inquiry signal explicitly and/or implicitly) whether the WTRU may (e.g., must) perform an uplink paging inquiry response transmission. A paging inquiry signal may be based on, for example, a number of groups of ZC base sequence. For example, a (e.g., one) sequence of the groups may be used (e.g., only) for paging inquiry transmission without triggering the response transmission. In another example, a paging inquiry signal may carry binary information (e.g., explicitly) to indicate a request for a response transmission.

A paging inquiry response transmission configuration may be based on association with paging inquiry signal. A WTRU may, for example, use a PRACH preamble transmission for a paging inquiry response transmission. A preamble configuration may be signaled, for example, in system information broadcast and/or higher layer signaling.

A configuration may be based on explicit and/or implicit association with a received paging inquiry signal. The association may be used to determine, for example, one or more of the following: transmit timing, frequency resource mapping, preamble sequence determination, scrambling sequence selection, numerology selection, beamforming configuration and/or UL TX power determination.

Transmit timing may comprise, for example, a relative pre-defined offset of numbers of symbols, mini-slots, slots between the end of a paging inquiry transmission duration and the start of a paging inquiry response transmission. Timing may be relative to the start of a PO. Timing may be specific to a downlink beam in which a paging inquiry signal may be received.

Frequency resource mapping may include, for example, a pre-defined relation in terms of beam-specific mapping and/or a look-up table that a WTRU may use to determine a frequency resource allocation of an uplink paging inquiry response transmission, e.g., based on a frequency resource set of a received paging inquiry signal. For example, a response transmission frequency resource may be based on, for example, a paging inquiry signal frequency resource set and/or a pre-defined offset, such as an FDD duplex distance. For example, a response transmission may be configured with a fixed frequency resource allocation, e.g., in the center of an uplink frequency band.

Preamble sequence determination may comprise, for example, a pre-defined relation in terms of beam-specific mapping and/or a look-up table that a WTRU may use to determine a preamble sequence based on a receive paging inquiry signal sequence. For example, a preamble sequence index may be based on a paging inquiry sequence index and/or a pre-defined offset. For example, a preamble sequence index may be a function of parameters tied to a paging inquiry signal (e.g., sequence index) and/or WTRU ID. This may enable a WTRU to identify itself to a network and/or may enable the network to determine whether future steps may be needed on such a beam. For example, a TRP might not proceed with transmission of a paging message on a beam, for example, when a PI might not have been intended for the WTRU.

Scrambling sequence selection may comprise, for example, scrambling a determined preamble sequence with a sequence, e.g., based on a received paging inquiry signal sequence. For example, a WTRU may use a pre-defined mapping/table/formula to derive a scrambling sequence index, e.g., based on a paging inquiry signal sequence index.

Numerology selection may comprise, for example, a response transmission using numerology of a received paging inquiry signal. A WTRU may use a pre-defined fixed numerology configuration.

For example, in one or more beamforming configurations, a paging inquiry response transmission may be transmitted in a WTRU UL transmit beam corresponding to a TRP DL transmit beam in which the paging inquiry signal may be received, e.g., with higher power. Correspondence may be based on, for example, a spatial match between an Angle-of-arrival (AoA) of a paging inquiry signal and an Angle-of-departure (AoD) of a paging inquiry response signal. A paging response transmission message may be beam swept as a function of a TRP DL transmit beam in which the paging inquiry signal may be received.

UL TX Power determination may comprise, for example, a pre-defined relation in terms of mapping and/or a look-up table a WTRU may use to determine a UL power for transmission of a paging inquiry response transmission. For example, a paging inquiry response transmission may be transmitted at a power that may be a function of received signal quality of a reception of a paging inquiry.

For example, a WTRU may transmit a pre-defined paging inquiry response sequence, for example, the pre-defined paging inquiry response sequence may be the same as a received paging inquiry sequence and/or a pre-defined paging inquiry response signal content, for example, an identity common for WTRUs within the same downlink beam and/or for WTRUs configured within the same group based on its service type, WTRU capability, DRX cycle, etc. WTRUs within a downlink transmit beam (e.g., upon reception of the paging inquiry signal) may transmit the same sequence and/or signal in a paging inquiry response. This combined transmission may increase the likelihood of TRP reception of the response and/or transmission of associated paging control and/or data channels.

For example, a WTRU may apply a minimally-configured uplink transmission for a paging inquiry response transmission. A minimal configuration may involve minimum WTRU RF and/or baseband processing, e.g., by using narrow band and/or single tone transmission. A TRP may estimate received uplink energy associated with a (e.g., one or more, or each) paging inquiry response and/or may determine which downlink beam may be used for subsequent paging control or/data transmission.

For example, a WTRU may transmit a pre-defined paging inquiry response sequence that is configured in system information. The WTRU may transmit such sequence in a resource dedicated for PRACH transmission for random access and/or a system information request transmission.

A WTRU may (e.g., explicitly and/or implicitly) provide information in a paging inquiry response transmission. Information may include, for example, an identity of a downlink beam in which a paging inquiry signal may be received, such as a paging inquiry sequence index, a beam reference signal index, downlink beam ID, a WTRU ID and/or indication thereof (e.g., S-TMSI), etc. For example, a WTRU may transmit an index that may represent its position within a group of WTRUs paged within a paging inquiry signal. For example, a paging inquiry signal may (e.g., implicitly and/or explicitly) encode a group ID and/or a number of WTRUs in the group. A WTRU may determine its position within a group, for example, using a function of its WTRU ID, DRX cycle, etc., such as a modulo operation applied on the WTRU ID based on the number of WTRUs in the group. A WTRU may transmit its position in a group, e.g., along with a paging inquiry response signal.

For example, a WTRU may be configured with a group of dedicated preamble sequences reserved for a paging inquiry response transmission based on contention-free PRACH transmission. When receiving a paging inquiry, the WTRU may select a preamble sequence from the group based on its WTRU ID, for example IMSI and/or Service Architecture Evolution (SAE)-Temporary Mobile Subscriber Identity (S-TMSI). The WTRU selection may apply an arithmetic and/or logic function F( ) (e.g., HASH and/or modular function), with the WTRU ID as an input. The WTRU may use other inputs to F( ), such as parameters of received paging inquiry signal associated with the PO, $PI_{time}$, $PI_{frequency}$, and/or $PI_{sequence}$. A WTRU may use parameters pertaining to the paging group as inputs to derive the preamble sequence. Including multiple inputs (such as, for example, WTRU ID and/or paging inquiry signal parameters) may help attempt to ensure the relative uniqueness of one or more, or each, selected preamble and/or attempt to avoid and/or limit contention.

WTRU selection of such a dedicated preamble transmission may cause the network to be aware of the preamble used for the paging inquiry transmission without an explicit configuration. The network may ensure that no other WTRUs may be configured with the preamble expected in an upcoming paging inquiry response transmission.

The network may be aware of whether multiple WTRUs may use the same preamble for paging inquiry response, e.g., whether there may be a contention in the upcoming paging inquiry response transmission. The network may be aware of WTRU ID of the WTRUs to be paged and/or their paging configuration parameters. The network may derive the preamble to be expected (e.g., in a manner described with respect to a WTRU) so that the network can use the knowledge of the derived preamble(s) to avoid paging situations that would lead to the selection of an identical preamble.

If the network expects a contention and/or proceeds in the case of a preamble contention, the network may send paging records with WTRU IDs in MSG2 transmission. The network may send uplink scheduling information in MSG2 transmission when contention is not expected. A WTRU may monitor and/or receive the MSG2 transmission (e.g., in either case) in a WTRU-specific manner, for example using temporary RNTI and/or using a WTRU-specific search space based on WTRU ID and/or received paging inquiry transmission parameters.

A position in the group may be signaled by the WTRU through the selection of a preamble and/or for transmission of the PRACH. For example, the WTRU may be configured with a set of preambles and/or one or more resources that it can use for paging inquiry response. One or more, or each of the preambles may correspond to a position in the group of WTRUs associated with a specific paging inquiry. The WTRU, perhaps for example upon receiving a paging inquiry and/or determining that it is part of the paging group indicated with the paging inquiry, may determine its own WTRU position (e.g., using a modulo operation with its WTRU ID, DRX cycle, etc.) within the group and/or transmit the preamble associated with its position as the paging inquiry response signal. A WTRU may receive (e.g., in response to the PRACH transmission), a grant and/or timing alignment associated with its preamble transmission to allow it to perform connection establishment (e.g., MSG3 transmission) following (e.g., immediately following) reception of the paging data.

A WTRU may transmit a paging inquiry response in the form of a PRACH transmission on a set of PRACH resources usable for other PRACH transmission purposes (e.g., initial access, system information request).

A WTRU may transmit paging inquiry response on a set of resources allocated by the network following transmission of the paging inquiry. The time/frequency location of such resources may be determined by association with the inquiry signal (for example, as described herein).

A WTRU may transmit multiple paging inquiry responses, e.g., tied to multiple DL transmit beams. This may enable load balancing on different beams. A WTRU may (e.g., successfully) receive a paging inquiry in multiple DL transmit beams and/or may indicate to a TRP that it may be served on any of the DL transmit beams. A WTRU may (e.g., in this case) indicate that it may be transmitting a set of paging inquiry responses (e.g., implicitly indicated in a paging inquiry response on one or more, or each, beam). An indication may be achieved, for example, using WTRU ID as a function for a paging inquiry response.

A WTRU may be configured to determine and/or set a power level associated with a paging inquiry response transmission (e.g., message). A WTRU may estimate a beam-specific downlink path loss, for example, based on a received paging inquiry signal strength and/or a paging inquiry signal transmit power that may be pre-configured (e.g., in a system information broadcast). Path loss may be specific to a paging inquiry signal frequency resource. A set of offset parameters may be applied (e.g., in addition to the path loss), for example, to set a power of a paging inquiry response transmission. A set of offset parameters may account for adjustment for an expected paging inquiry response received at the TRP, which may depend on a selected frequency resource and/or transport format of content.

For example, a WTRU may apply a pre-defined fixed power to a transmission (e.g., a maximum power).

For example, a WTRU may perform power ramping of subsequent transmission of a paging inquiry response transmission. For example, a WTRU may increase the power of transmissions, for example, when it receives subsequent paging inquiries that may be interspaced by a specified and/or configured period of time. For example, a WTRU may increase its transmission power by a predefined amount, for example, when the WTRU receives a paging inquiry that may be spaced less than or equal to x frames/subframes/slots/etc. from a previous paging inquiry reception. A WTRU may (e.g., otherwise) transmit its paging inquiry response at a minimum and/or nominally configured power. For example, a WTRU may increase a power of a paging inquiry response, for example, when the WTRU receives multiple paging inquiries on the same DL transmit beam in a configured amount of time, e.g., without having successfully received a paging message (control and/or data) after transmitting a paging inquiry response. For example, a WTRU may receive a first paging inquiry message on a DL transmit beam. A WTRU may respond with a paging inquiry response. A WTRU may receive a second paging inquiry signal on the same DL transmit beam within a configurable time period, e.g., without having received a paging message (control and/or data) tied to its paging inquiry response. A WTRU may (e.g., in this case) increase the power of the paging inquiry response.

A WTRU may be configured to perform a paging inquiry response re-transmission. A WTRU may be configured with a monitoring window between the end of a response transmission and the end of monitoring of request paging control and/or data transmission. A WTRU may apply a re-transmission of a paging inquiry response, for example, when a paging transmission is not received during a monitoring window. A WTRU may (e.g., also) be configured with a maximum number of a monitoring window, which may be specific to a PO duration. A WTRU may increase the power of a response re-transmission with a pre-configured step size. For example, a WTRU may be configured with a timer to specify a duration in which paging inquiry response re-transmission may be used. A timer value may be based on, for example, a configured re-transmission interval and/or PO duration. A WTRU may be configured with a maximum number of paging inquiry response retransmission(s). A configuration may be included in a configuration of a paging inquiry signal (e.g., as part of system information). A WTRU may determine that a paging inquiry procedure might not be successful, for example, when the WTRU might not receive a paging message within a monitoring window associated with a paging inquiry response transmission. A paging message may or might not include paging for a concerned WTRU. A WTRU may determine that it may remain reachable in a current cell from the reception of a paging message. A WTRU may perform one or more error handling actions, for example, when it determines that a paging procedure may be (e.g., is) unsuccessful.

A WTRU may use absence of the reception of MSG2 within a predefined time window to as a trigger to initiate a retransmission of the paging inquiry response. The predefined time window may be configured, and/or it may be identical to the window for reception of MSG2 during other PRACH transmissions (e.g., initial access, SI request).

Simultaneous multiple paging inquiry response transmissions may occur. A WTRU may receive multiple paging inquiry signals in different downlink beams, for example, when the WTRU may be located between downlink beams. A WTRU may transmit a paging inquiry response simultaneously in multiple uplink beams corresponding to downlink beams in which paging inquiry signals may be received. Simultaneous multiple transmission may depend on the number of transceivers a WTRU may be equipped with. For example, a WTRU may use uplink beam sweeping, for example, by transmitting a paging inquiry response in (e.g., one or more, or all) uplink beams, such as when beam correspondence might not be present at a TRP. For example, a WTRU may transmit a paging inquiry response on more than one uplink beam, for example, over beams corresponding to beams for a paging inquiry received with the largest power. A WTRU may determine that a procedure might not be successful, for example, when at least one paging message is not received within a monitoring window associated with a (e.g., any) paging inquiry response transmission (e.g., after performing multiple transmissions for a concerned procedure). A WTRU may perform one or more error handling actions, for example, when it determines that a paging procedure may be unsuccessful.

There may be an association between a paging inquiry response and paging control and/or data transmission. A WTRU may monitor paging control and/or data transmission, for example, based on an association between an uplink response transmission and a paging transmission.

For example, in a timing relation(s), a fixed timing offset may be pre-defined between the end of an uplink response transmission and the start of a downlink paging transmission. An offset may be in terms of a number of symbols, mini-slot, slots, etc.

For example, in beamforming configuration(s), a WTRU may monitor a paging transmission in a downlink beam indicated in an uplink paging inquiry transmission.

Paging control channel CRC and/or data bits may be scrambled, for example, based on a WTRU ID that may be transmitted in a paging inquiry response. A downlink control channel carrying paging DCI may include CRC bits that may be scrambled/masked with a sequence based on, for example, WTRU ID that may be transmitted in a paging inquiry response transmission. For example, TRP and/or WTRU may apply a (e.g., pre-defined) function, for example, to generate a scrambling sequence with the same length as downlink control channel CRC bits. A WTRU might not have a WTRU specific radio network temporary identity (RNTI), for example, when the WTRU in RRC IDLE mode receives a paging inquiry signal and/or transmits a corresponding response signal. A WTRU ID-based scrambling sequence may be a temporary paging identity that may enable WTRU-specific paging control and/or data channel transmission.

A TRP may use a temporary paging identity, for example, to mask CRC bits of a downlink WTRU-specific control channel that may be intended for WTRU paging data scheduling information.

A WTRU may be configured to use one or more WTRU-specific control channel search spaces (e.g., for paging). A WTRU may monitor a paging DCI in a WTRU-specific downlink control channel search space. A WTRU may attempt to decode a paging DCI using a temporary paging identity. The location of a control channel search space in terms of a starting control channel element (CCE) index and/or symbol index may be determined based on, for example, one or more of the following: temporary paging identity that may be based on WTRU ID, WTRU ID and/or sub-frame index (e.g., that of the $PI_{time}$ and/or PO); association with a paging inquiry signal frequency resource set (e.g., a frequency offset in terms of one or more of a number of sub-carriers, PRBs and/or PRB blocks relative to the start of the paging inquiry signal frequency resource set, etc.; and/or pre-configured control channel space for paging DCI decoding.

WTRU processing may be reduced for WTRUs that may receive a paging inquiry signal and/or may transmit a response without a paging message. A WTRU may determine whether it has a paging message, for example, by descrambling a downlink control channel CRC. A WTRU may decode a paging data channel (e.g., only) after a CRC check of the control channel.

For example, a paging data channel may be scrambled, for example, using a temporary paging identity. Data channel scrambling may be bit-level scrambling of data and/or CRC bits scrambling.

Following transmission of a paging inquiry response, a WTRU may receive paging data. A WTRU may initiate monitoring of a paging message. Such message may be scrambled with P-RNTI and/or a dedicated RNTI. The dedicated RNTI may be specific to the WTRU, such as a C-RNTI and/or similar. The dedicated RNTI may be tied to the paging inquiry itself. For example, one or more, or each, value and/or ID which may be transmitted in a paging inquiry message may be associated to a dedicated RNTI. Such association may be made by configuration (e.g., in system information) and/or known to the WTRU through a predefined calculation formula.

A WTRU may transmit a paging inquiry response through a PRACH and/or may monitor RA-RNTI for reception of MSG2. The WTRU may receive the paging data (e.g., list of paging records) as part of the payload of MSG2. The paging data may comprise a set of WTRU IDs, such as an LTE paging record. A WTRU whose WTRU ID is contained in the paging data may continue a RACH procedure (e.g., transmission of an RRC Connection Request message in the MSG2 grant). A WTRU that transmitted the paging inquiry response message, but did not receive MSG2 in a time window (taking into account possible retransmissions, as described herein) and/or received MSG2 that does not contain its own WTRU ID, may abort the RACH procedure.

A WTRU may receive MSG2 containing a RAPID (random access preamble ID), indicating successful reception of the paging inquiry response. The WTRU may receive paging data in a separate transmission from the network, such as a legacy paging message sent in a paging occasion, and/or at a specific offset from the paging inquiry response transmission, as described herein. For example, a WTRU may be configured with at least two paging occasions within a paging frame. Following reception of a paging inquiry coming in the first configured paging occasion, perhaps for example if the WTRU determines that a response to the paging inquiry is to be transmitted, the WTRU may transmit PRACH (as described herein). In scenarios including a case of successful reception of MSG2 for which the RAPID contains the transmitted preamble, the WTRU may (e.g., may also) monitor the second paging occasion for reception of paging data. The WTRU may monitor the second paging occasion (and/or a subsequent paging occasion) using P-RNTI, and/or a dedicated RNTI, as described herein.

A WTRU may undertake connection establishment following reception of paging data. A WTRU may receive paging data following a paging inquiry response and/or may initiate an RRC Connection Establishment by transmission of MSG3 following reception of such data. The WTRU may utilize one or more of the following resources for transmission of MSG3: the WTRU may be provided with a grant, together with the paging message and/or response to the paging inquiry response (e.g., associated with the RAPID in MSG2); the WTRU may receive a grant through a DCI message on PDCCH (the reception of such DCI message may have a defined time relationship with the reception of the paging message/paging information); the WTRU may utilize a preconfigured grant, and/or contention-based (grant-free) resource to transmit the RRC Connection Request; and/or the WTRU may request such grant using a separate RACH procedure, initiated by the WTRU (e.g., following reception of the paging data).

For example, a WTRU may receive paging information in MSG2, e.g., in addition to a grant for transmission of MSG3. A WTRU may receive multiple grants in MSG2 associated with a single random access preamble ID. One or more, or each, grant may be associated with one of the WTRU IDs in the paging message and/or paging record. A WTRU may transmit MSG3 using the Nth grant in MSG2, where N corresponds to the position of the WTRU ID within the paging record. For example, a (e.g., single) grant may be provided in MSG2, and/or the WTRU may (e.g., may always) use that grant to transmit MSG3.

A WTRU may be configured to implement one or more paging procedures (e.g., with a PI block). A PI block may be, for example, non-stand-alone and/or stand-alone. A WTRU may wake up before a paging occasion (PO) and/or sweep a receiver beam, for example, to synchronize with a synchronization signal (SS) block. A WTRU may select one or more downlink beams for paging inquiry signal reception, for example, based on pre-defined rules. For example, a WTRU may use one or more downlink beams where, for example, the best (e.g., in terms of received power) SS block may be received and/or the SS block received level may be above a pre-defined threshold. A WTRU may use an SS block for timing and/or frequency reference for a (e.g., one or more, or each) downlink beam for a WTRU paging procedure.

FIG. 5 is an example of a WTRU paging procedure based on an SS block and/or a PI block. A WTRU may (e.g., as shown in an example in FIG. 5) monitor a paging inquiry signal in the beginning of a paging occasion (PO) in a selected downlink beam (e.g., based on a paging inquiry signal configuration). A WTRU may receive a paging inquiry signal. A WTRU may receive paging control and/or data transmission, for example, based on an association between a paging inquiry signal and paging control and/or data channels. A paging inquiry signal and/or paging channels may be transmitted in (e.g., one or more, or all) downlink beams during a PO. A paging control channel may contain a paging DCI that a WTRU may use to decode a paging data channel. A paging inquiry signal and/or a paging data transmission may be repeated in (e.g., one or more, or all) downlink beams. At 5014, the examples illustrated in FIG. 5 could apply to the SS Block instead of, or in addition/equally to, the PI Block.

Figure 6:
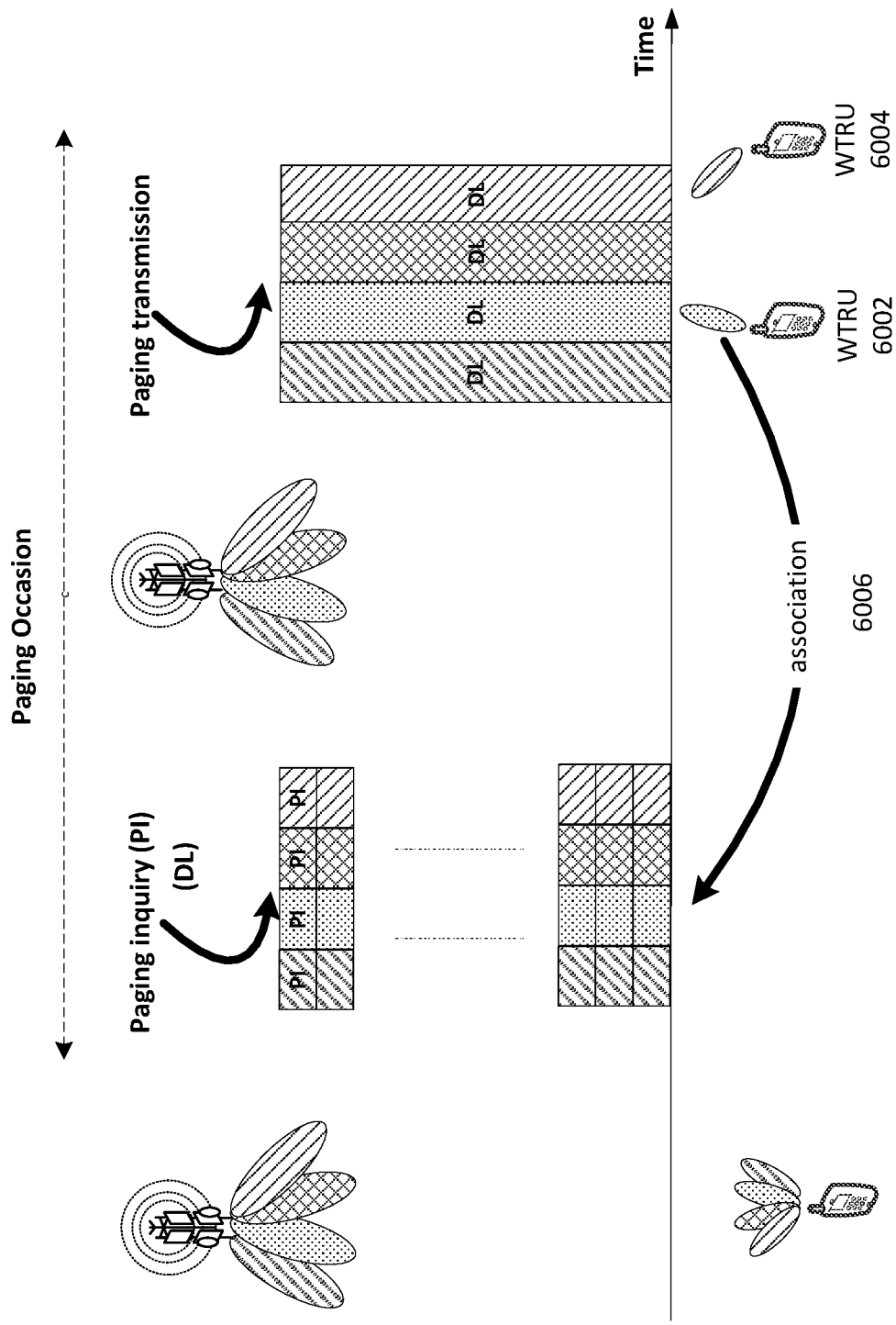
FIG. 6 is an example of a WTRU paging procedure based on a stand-alone PI block.

FIG. 6 is an example of a WTRU paging procedure based on a stand-alone PI block. For example, a paging inquiry signal may be stand-alone (e.g., as shown by example in FIG. 6) and/or may provide (e.g., independent) timing and/or frequency synchronization. A WTRU may sweep a receiver beam and/or monitor paging inquiry signal, for example, in the beginning of a PO (e.g., based on a paging inquiry signal configuration). A WTRU may receive a paging inquiry signal in one or more downlink beams and/or may select one of one or more, or multiple, downlink beams for further paging control and/or data reception. Downlink beam selection may be based on pre-defined rules. For example, a WTRU may use one or more downlink beams where, for example, the best paging inquiry signal may be received (e.g., in terms of received power) and/or the paging inquiry signal received level may be above a pre-defined threshold. A WTRU may monitor and/or receive paging control and/or data channels (e.g., as discussed with respect to a non-stand-alone PI block). A WTRU may use timing and/or frequency from a paging inquiry signal as a downlink reference during a paging occasion. At 6006, WTRU 6002 and WTRU 6004 illustrate an association between paging transmission DL and a paging inquiry block.

For example, SS blocks that may be transmitted within a paging occasion may be used to indicate whether a paging inquiry may be present in a DL transmit beam. For example, an SS block in a PO may have two sets of parameters (e.g., SS sequence). A (e.g., one or more, or each) set of parameters may be used to indicate whether a paging inquiry may be present within a DL transmit beam.

For example, an aperiodic SS may be transmitted, for example, perhaps when a paging inquiry may be transmitted in a paging occasion. An aperiodic SS may be used in conjunction with a paging inquiry, e.g., to enable beam acquisition. Presence of an aperiodic SS may be used as a paging inquiry.

Figure 7:
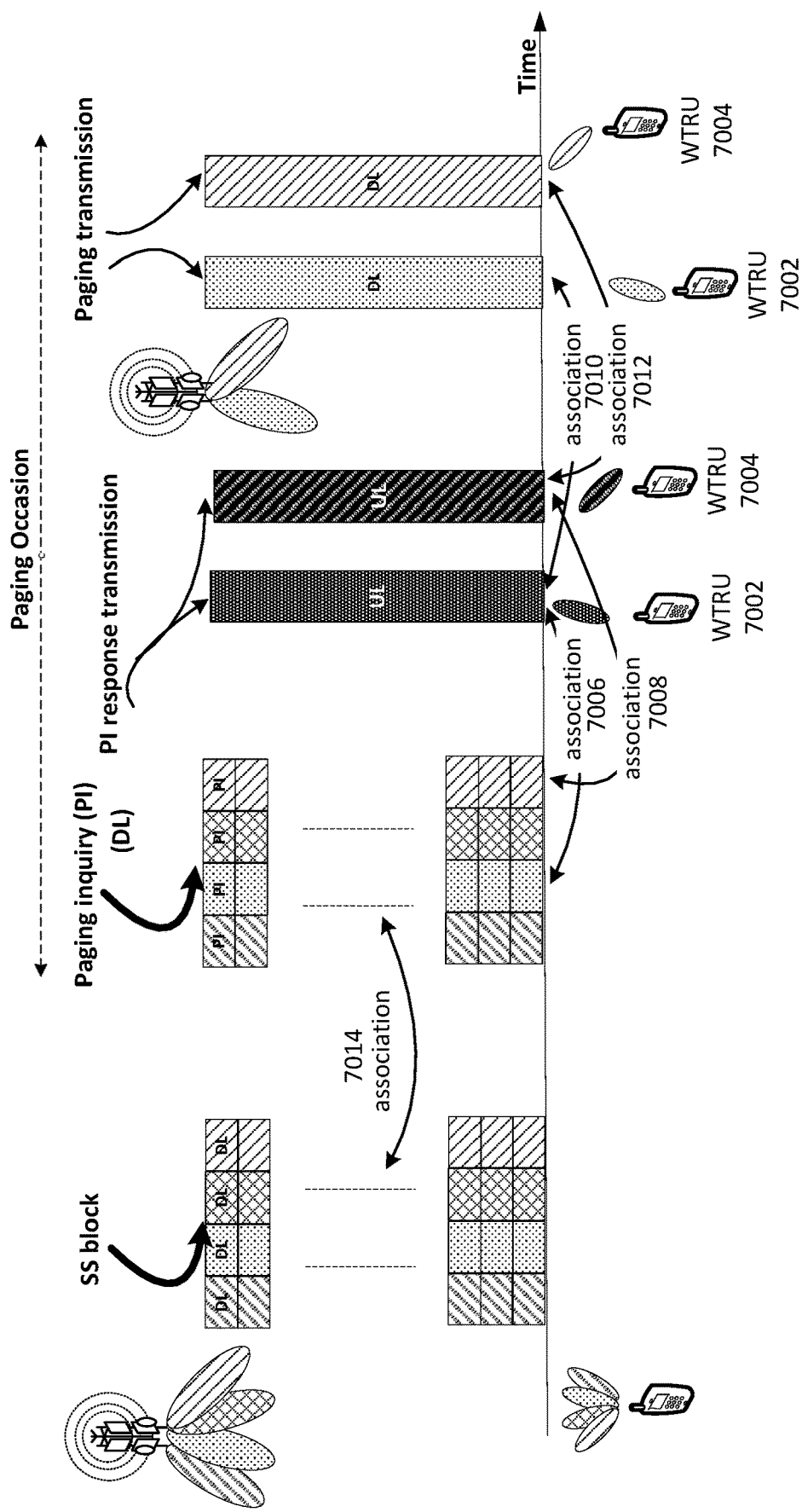
FIG. 7 is an example of a WTRU paging procedure based on an SS block and/or a PI block with a PI response transmission.

FIG. 7 is an example of a WTRU paging procedure based on an SS block and/or a PI block with a PI response transmission. A WTRU paging procedure (e.g., non-stand-alone and/or stand-alone) may include the WTRU receiving a PI block(s) and/or the WTRU transmitting a PI response transmission. A WTRU may receive a paging inquiry signal in a pre-selected downlink beam, for example, as described with respect to a WTRU paging procedure with a PI block. For example (e.g., shown in FIG. 7), a WTRU may transmit an uplink paging inquiry response, for example, based on a network configuration and/or indication of a paging inquiry signal. A paging inquiry response may be based on, for example, a PRACH preamble transmission and/or minimally-configured uplink transmission. A transmission may carry (e.g., at least) a downlink beam indication and/or a WTRU ID. A WTRU may monitor a subsequent paging transmission within a downlink beam that may be indicated by a paging inquiry response transmission. A WTRU may apply a paging inquiry response re-transmission procedure (e.g., as described herein). Paging control and/or data channels may be transmitted in downlink beams (e.g., indicated by paging inquiry response transmission) and/or may apply a scrambling using, for example, a WTRU ID on paging control channel CRC bits, paging data bits and/or paging data CRC bits. Paging transmission might not be carried in one or more, or all, downlink beams (e.g., as shown by example in FIG. 7).

In FIG. 7, WTRU 7002 and WTRU 7004 illustrate, at 7006, an association between a paging inquiry (PI) and a PI response transmission UL. WTRU 7002 and WTRU 7004 illustrate, at 7008, an association between a paging inquiry (PI) and a PI response transmission UL. WTRU 7002 and WTRU 7004 illustrate, at 7010, an association between a paging transmission DL and a PI response transmission UL. WTRU 7002 and WTRU 7004 illustrate, at 7012, an association between a paging transmission DL and a response transmission UL. At 7014, the examples illustrated in FIG. 7 could apply to the SS Block instead of, or in addition/equally to, or cooperatively with, the PI Block.

For example, a wireless transmit/receive unit (WTRU) may be in communication with a wireless communication network. The WTRU may select at least one beamformed synchronization signal block (SSB) associated with an occurrence of a paging occasion (PO). The at least one beamformed SSB provided by a node of the wireless communication network. The WTRU may determine a Paging Inquiry (PI) signal configuration based on the selected at least one SSB and/or a WTRU identifier (ID). The WTRU may determine one or more PI signal timing parameters from the PI signal configuration. The WTRU may determine a first portion of the PO based on the determined one or more PI timing parameters. The WTRU may monitor for the PI signal during the first portion of the PO. The WTRU may detect the PI signal. The WTRU may send a PI response to the node of the wireless communication network using a first beam. The PI response may include an indication for a second beam and/or the WTRU ID. The WTRU may receive a paging transmission using the second beam.

For example, the WTRU may determine that the paging transmission may be receivable in no other beam but the second beam. The WTRU may determine that the PI response (e.g. message) may be sent upon the determination that the common PI signal indicates that a paging transmission is to be directed to the WTRU.

The WTRU may determine that the indication for the second beam is at least one of: implicit, or explicit. The WTRU may determine that the indication for the second beam indicates the second beam may be used for the paging transmission to the WTRU.

The first portion of the PO may be a time portion. The WTRU may determine that the common PI signal indicates that the paging transmission is to be directed to the WTRU in a later portion from the first portion of the PO. The determination of the one or more transmission resources based on the common PI signal may be an implicit determination.

One or more techniques described herein may allow the network, based on the received Paging Inquiry Reponses, to transmit a paging transmission (e.g., only) over resources (e.g. one or more beams) where potentially paged WTRU's are reachable, perhaps for example instead of all possible resources. Stated somewhat differently, one or more techniques described herein may allow one or more WTRUs, based on the received Paging Inquiry Reponses, to receive a paging transmission (e.g., only) over resources (e.g. one or more beams) where potentially paged WTRU's are reachable, perhaps for example instead of all possible resources.

For example, a PI block may be stand-alone based on a group PI block (e.g., as shown by example in FIG. 8) and/or based on a distributed PI block (e.g., as shown by example in FIG. 9). A WTRU may use a timing and/or frequency reference (e.g., obtained from a paging inquiry signal of a selected downlink beam), for example, as downlink reference timing during a paging occasion for an uplink paging inquiry response transmission and/or reception of paging control and/or data transmission.

FIG. 8 is an example of a WTRU paging procedure based on a stand-alone PI block with a PI response transmission with a grouped PI block.

In FIG. 8, WTRU 8002 and WTRU 8004 illustrate, at 8006, an association between a paging inquiry (PI) and a PI response transmission UL. WTRU 8002 and WTRU 8004 illustrate, at 8008, an association between a paging inquiry (PI) and a PI response transmission UL. WTRU 8002 and WTRU 8004 illustrate, at 8010, an association between a paging transmission DL and a PI response transmission UL. WTRU 8002 and WTRU 8004 illustrate, at 8012, an association between a paging transmission DL and a PI response transmission UL.

FIG. 9 is an example of a WTRU paging procedure based on a stand-alone PI block with a PI response transmission with a distributed PI block.

In FIG. 9, WTRU 9002 illustrates, at 9006, an association between a paging inquiry (PI) and a PI response transmission UL. WTRU 9002 illustrates, at 9008, an association between paging transmission DL and a PI response transmission UL. WTRU 9004 illustrate, at 9010, an association between a paging inquiry (PI) and a PI response transmission UL. WTRU 9004 illustrates, at 9012, an association between a paging transmission DL and a PI response transmission UL.

A paging data transmission may be scheduled by a paging DCI that may be carried in a downlink control channel and/or may be unscheduled. A WTRU may receive an unscheduled downlink paging data channel using blind format detection with a pre-defined set of transport formats (e.g., modulation and coding schemes). A WTRU may determine a frequency resource allocation of a paging data channel, for example, based on an association with a paging inquiry signal. For example, a WTRU may determine a transport format, for example, based on a downlink path loss that may be estimated on a paging inquiry signal transmission and/or a pre-defined mapping and/or look-up table that may be between a path loss and data channel transport format.

Figure 10:
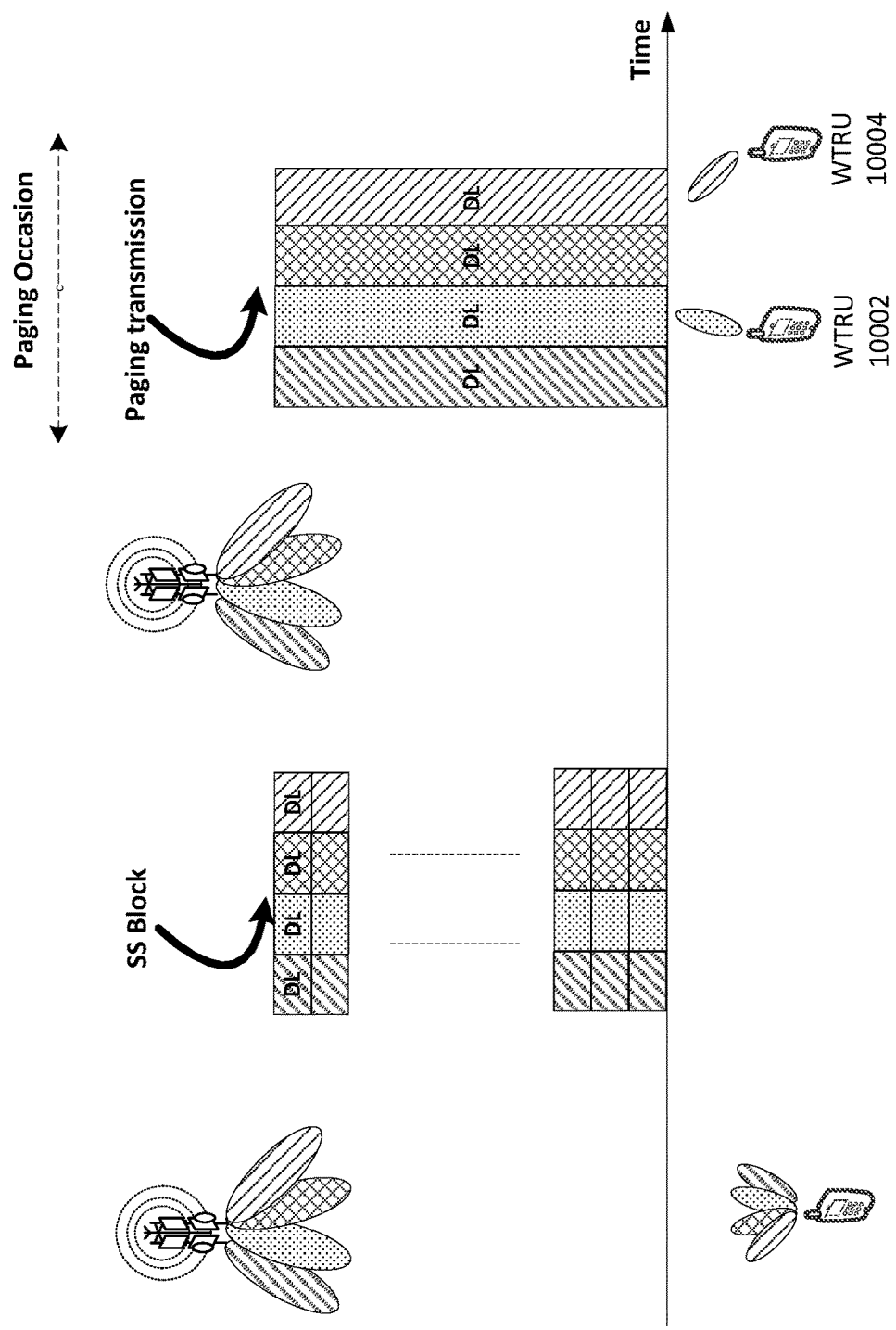
FIG. 10 is an example of a WTRU paging procedure based on an SS block.

FIG. 10 is an example of a WTRU paging procedure based on an SS block. For example, a WTRU may receive paging control and/or data channels without a paging inquiry signal (e.g., as shown by WTRU 10002 and/or WTRU 10004 for example in FIG. 10). A WTRU may wake up before a pre-configured paging occasion and/or may select a downlink beam for paging reception (e.g., based on an SS block as described herein). A WTRU may decode a paging DCI in a downlink control channel that may be associated with an SS block in a selected downlink beam. A WTRU may use P-RNTI to monitor a paging DCI in a downlink control channel common search space. A WTRU may decode a paging data channel, for example, based on a received paging DCI.

A WTRU specific temporary paging identity may be calculated, for example, based on a WTRU ID (e.g., IMSI and/or S-TMSI). A downlink control channel that may contain a paging DCI may include CRC bits that may be scrambled/masked, e.g., by a WTRU specific temporary paging identity. A WTRU may monitor a paging DCI in a downlink control channel WTRU-specific search space. A WTRU-specific search space for paging may be, for example, as described herein. A WTRU-specific paging transmission may be repeated in (e.g., one or more, or all) beams from (e.g., one or more, or all) TRPs in a tracking area.

The WTRU and/or network node (e.g. gNB) may be configured to implement one or more error handing procedures for a WTRU paging procedure. A WTRU may determine that a paging procedure may be unsuccessful. A WTRU may determine that a paging procedure may be unsuccessful based on a timer and/or maximum re-transmission counter setting configured for the monitoring of network downlink transmission associated with the transmitted paging inquiry signal. For example, a PRACH-based network transmission for a paging inquiry transmission may apply the maximum retransmission and/or number of re-attempts configured for the random-access procedure. In another example, a WTRU may use timers and/or maximum paging inquiry response retransmission/retry configuration specific to the DRX cycle configuration the WTRU may operate. A WTRU may (e.g., further) determine that it may no longer receive paging in a concerned cell. A WTRU may perform, for example, one or more of the following: cell re-selection; and/or network access initiation, e.g., to perform a routing area update and/or a tracking area update. This may occur, for example, when the WTRU may reselect the same cell as the cell in which the WTRU determined that the paging procedure was unsuccessful. For example, a WTRU may return to an inactive state and/or may monitor the paging inquiry signal in the next ON period configured in the ongoing DRX cycle.

Systems, methods, and instrumentalities have been disclosed for beamformed paging. A TRP may transmit a paging inquiry signal using beam sweeping in a paging inquiry (PI) block with a different time, frequency resource set and/or sequence configuration associated with the same paging occasion (PO), for example, to randomize and/or distribute WTRUs into different monitoring groups. A WTRU may transmit an uplink paging inquiry response indicating a downlink beam for a paging data transmission and/or a WTRU ID. A downlink control and/or a data channel transmission may be triggered by a paging inquiry response transmission. Paging downlink control information (DCI) may be transmitted in a WTRU-specific control channel, which may contain CRC bits masked by a temporary paging identity, e.g., based on a WTRU ID that may be reported in a paging inquiry response transmission. A WTRU paging procedure may be based on a paging inquiry signal and/or response transmission (e.g., stand-alone or non-stand-alone with synchronization signal (SS) block). Error handling may be used to improve paging reliability.

Processes and/or instrumentalities described herein may apply in any combination, may apply to other wireless technologies, and/or for other services.

A WTRU may refer to an identity of the physical device, and/or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random-access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) in communication with a wireless communication network, the WTRU comprising:
   a memory;
   a processor, the processor configured at least to:
      select at least one beamformed synchronization signal block (SSB) associated with an occurrence of a paging occasion (PO);
      determine a Paging Inquiry (PI) signal configuration based on the at least one SSB and a WTRU identifier (ID);
      monitor for a PI signal during a portion of the PO, wherein timing information to monitor for the PI signal during the portion of the PO is determined based on the PI signal configuration;
      detect the PI signal; and
      send a PI response using a first beam if the PI signal is detected, the PI response including an indication that a second beam is to be used for a paging transmission, an indication of a preamble, and an indication of the WTRU ID; and a receiver, the receiver configured at least to:
receive a paging transmission using the second beam.

2. The WTRU of claim 1, wherein the processor is further configured to determine one or more transmission resources based on the PI signal, the one or more transmission resources being used for transmission of the first beam.

3. The WTRU of claim 1, wherein the processor is further configured to determine one or more of: a frequency resource allocation for the PI signal from the PI signal configuration, a sequence index for the PI signal from the PI signal configuration, or a time for the PI signal from a time offset and the portion of the PO.

4. The WTRU of claim 1, wherein the processor is further configured to determine that the paging transmission is only received by the second beam.

5. The WTRU of claim 1, wherein the processor is further configured such that the PI response is sent upon a determination that the PI signal indicates that the paging transmission is to be directed to the WTRU.

6. The WTRU of claim 1, wherein the at least one beamformed SSB is received from a node of the wireless communication network.

7. The WTRU of claim 1, wherein the PI signal configuration comprises one or more of the WTRU ID, a discontinuous reception (DRX) cycle duration, a WTRU service type, a sub-frame number, a sub-frame index, or a PO location.

8. The WTRU of claim 1, wherein the portion is a first portion, and wherein the PI signal is received in the first portion of the PO and the paging transmission is received in a second portion of the PO.

9. The WTRU of claim 1, wherein the processor is further configured to determine that the PI signal indicates that the paging transmission is to be directed to the WTRU based on one or more elements of a sequence configuration of the PI signal.

10. The WTRU of claim 9, wherein the one or more elements of the sequence configuration of the PI signal includes one or more of: the WTRU ID, a discontinuous reception (DRX) cycle, or a PO index.

11. The WTRU of claim 1, wherein the first beam is an uplink (UL) resource and the second beam is a downlink (DL) resource.

12. The WTRU of claim 1, wherein the PI signal indicates that the paging transmission is to be directed to the WTRU.

13. The WTRU of claim 1, wherein the PO is common to a plurality of wireless transmit/receive units (WTRUs).

14. A wireless transmit/receive unit (WTRU) in communication with a wireless communication network, the WTRU comprising:
a memory, and;
a processor, the processor configured at least to:
select at least one beamformed synchronization signal block (SSB) associated with an occurrence of a paging occasion (PO);
determine a Paging Inquiry (PI) signal configuration based on the at least one SSB and a WTRU identifier (ID);
determine a portion of the PO based on the PI signal configuration;
monitor for a PI signal during the portion of the PO;
send a PI response using a first beam if the PI signal indicates a paging transmission is to be directed to the WTRU, the PI response including an indication that a second beam is to be used for the paging transmission an indication of a preamble, and an indication of the WTRU ID; and
receive the paging transmission via the second beam.

15. The WTRU of claim 14, wherein the processor is further configured to determine one or more transmission resources based on the PI signal, the one or more transmission resources being used for transmission of the first beam.

16. The WTRU of claim 14, wherein the processor is further configured to determine one or more of a frequency resource allocation for the PI signal from the PI signal configuration, a sequence index for the PI signal from the PI signal configuration, or a time for the PI signal from a time offset and the portion of the PO.

17. A method implemented in a wireless transmit/receive unit (WTRU) for communicating with a wireless communication network, the method comprising:
selecting at least one beamformed synchronization signal block (SSB) associated with an occurrence of a paging occasion (PO);
determining a Paging Inquiry (PI) signal configuration based on the at least one SSB and a WTRU identifier (ID);
monitoring for a PI signal during a portion of the PO, wherein timing information to monitor for the PI signal during the portion of the PO is determined based on the PI signal configuration;
detecting the PI signal;
sending a PI response using a first beam if the PI signal is detected, the PI response including an indication that a second beam is to be used for a paging transmission, an indication of a preamble, and an indication of the WTRU ID; and
receiving a paging transmission using the second beam.

* * * * *